US012750306B2

(12) United States Patent
Varga et al.

(10) Patent No.: US 12,750,306 B2
(45) Date of Patent: Sep. 29, 2026

(54) GATE CONTROLLED FRAME OR PACKET REPLICATION AND ELIMINATION FUNCTION IN CLOUD ENVIRONMENT

(71) Applicant: Telefonaktiebolaget LM Ericsson (publ), Stockholm (SE)

(72) Inventors: Balázs Varga, Budapest (HU); János Farkas, Kecskemét (HU); György Miklós, Pilisborosjenö (HU); János Harmatos, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 332 days.

(21) Appl. No.: 18/287,937

(22) PCT Filed: Feb. 11, 2022

(86) PCT No.: PCT/IB2022/051255

§ 371 (c)(1),
(2) Date: Oct. 23, 2023

(87) PCT Pub. No.: WO2022/229712

PCT Pub. Date: Nov. 3, 2022

(65) Prior Publication Data

US 2024/0195730 A1 Jun. 13, 2024

Related U.S. Application Data

(60) Provisional application No. 63/179,818, filed on Apr. 26, 2021.

(51) Int. Cl.
*H04L 45/24* (2022.01)
*H04L 45/00* (2022.01)
(Continued)

(52) U.S. Cl.
CPC .............. *H04L 45/24* (2013.01); *H04L 45/22* (2013.01); *H04L 47/32* (2013.01); *H04L 47/34* (2013.01); *H04L 49/552* (2013.01)

(58) Field of Classification Search
CPC . H04L 1/08; H04L 1/20; H04L 45/128; H04L 45/22; H04L 45/24; H04L 45/28;
(Continued)

(56) References Cited

U.S. PATENT DOCUMENTS

2020/0389405 A1* 12/2020 Mardmoeller .......... H04L 47/34
2022/0050442 A1* 2/2022 Steindl ..................... H04Q 3/66
(Continued)

FOREIGN PATENT DOCUMENTS

WO 2021005397 A1 1/2021

OTHER PUBLICATIONS

International Search Report and Written Opinion of the International Searching Authority, PCT/IB2022/051255, mailed Apr. 19, 2022, 11 pages.
(Continued)

*Primary Examiner* — Donald L Mills
(74) *Attorney, Agent, or Firm* — Sage Patent Group

(57) ABSTRACT

A method for packet or frame replication and elimination in a network, includes obtaining by a gate controller downstream information indicating which application instance in an application cluster is downstream active needing to send a stream of packets or frames in a downstream direction through the network. The method further includes, based on the downstream information, controlling by the gate controller a gate within a gate cluster that is associated with the downstream active application instance to be open state which operates to forward the stream of packets or frames in the downstream direction from the downstream active application instance to an associated packet or frame replication
(Continued)

entity for replication and transmission via at least two disjoint paths through the network.

18 Claims, 17 Drawing Sheets

(51) Int. Cl.
*H04L 47/32* (2022.01)
*H04L 47/34* (2022.01)
*H04L 49/552* (2022.01)

(58) Field of Classification Search
CPC ....... H04L 47/32; H04L 47/34; H04L 47/625; H04L 49/552
See application file for complete search history.

(56) References Cited

U.S. PATENT DOCUMENTS

| | | | | |
|---|---|---|---|---|
| 2023/0031236 | A1* | 2/2023 | Bruckner | H04L 12/4625 |
| 2023/0379081 | A1* | 11/2023 | Sivasiva Ganesan | H04L 47/34 |

OTHER PUBLICATIONS

Varga, Balázs et al., "IEEE, 802.1 CB, Improvements, FRER, Improvements of Replication and Elimination Functions," Jul. 16, 2019, 13 pages.
IEEE, "IEEE Standard for Local and metropolitan area networks—Frame Replication and Elimination for Reliability," IEEE Std 802.1 CB-2017, 102 pages.
Finn, N. et al., "Deterministic Networking Architecture," Internet Engineering Task Force (IETF), Standards Track, RFC 8655, Oct. 2019, 38 pages.

* cited by examiner

GATE CONTROLLED FRAME OR PACKET REPLICATION AND ELIMINATION FUNCTION IN CLOUD ENVIRONMENT

CROSS REFERENCE TO RELATED APPLICATIONS

This application is a 35 U.S.C. § 371 national stage application of PCT International Application No. PCT/IB2022/051255 filed on Feb. 11, 2022, which in turn claims domestic priority to U.S. Provisional Patent Application No. 63/179,818, filed on Apr. 26, 2021, the disclosures and content of which are incorporated by reference herein in their entirety.

TECHNICAL FIELD

The present disclosure relates to Time Sensitive Networking (TSN) and Deterministic Networking (DetNet) and, more specifically, to frame or packet replication and elimination in a TSN or DetNet network.

BACKGROUND

Time-Sensitive Networking (TSN) is currently being developed at the Institute for Electronics and Electrical Engineering (IEEE) as a new technology that enhances IEEE 802.1 and IEEE 802.3 Ethernet standards to an entirely new level of determinism. It can be seen as an evolution of Ethernet to guarantee low end-to-end latency, low jitter, and low packet loss.

The TSN Task Group (TG) within the IEEE 802.1 Working Group (WG) deals with deterministic services through IEEE 802 networks. The TSN TG specifies the tools of the TSN toolbox, as well as the use of the tools for a particular purpose. TSN TG is chartered to provide deterministic services through IEEE 802 networks with:

guaranteed packet transport,
low packet loss,
bounded low latency, and
low packet delay variation.

In order to achieve extremely low packet loss, the TSN TG specified Frame Replication and Elimination for Reliability (FRER) (802.1CB), which is targeted to avoid frame loss due to equipment failure. It is practically a per-frame 1+1 (or 1+n) redundancy function. There is no failure detection/switchover incorporated. FRER sends frames on two (or more) maximally disjoint network paths, then combines the streams and deletes extra frames.

Note that the same functions are defined for Deterministic Networking (DetNet) networks as Packet Replication and Elimination Functions (PREFs) in order to simplify implementation and allow use of the same concept in both Layer2 (TSN) and Layer3 (DetNet) networks, such as described in Internet Engineering Task Force (IETF) RFC8655 (October 2019). In the description provided herein, the focus is on FRER although the embodiments can be applied to PREF.

Some aspects of the present disclosure are based on IEEE 802.1CB, so various terminology and variable names described in IEEE 802.1CB are used here where appropriate, denoted as "VariableName". In contrast, new variables, functions, and parameters follow IEEE 802.1CB naming convention and are denoted as "NewEntityName". Note as per IEEE 802.1CB: " . . . this standard defines Frame Replication and Elimination for Reliability (FRER), which divides a Stream into one or more linked Member Streams, thus making the original Stream a Compound Stream. It replicates the packets of the Stream, splitting the copies into the multiple Member Streams, and then rejoins those Member Streams at one or more other points, eliminates the replicates, and delivers the reconstituted Stream from those points."

An Elimination function evaluates the "sequence_number" sub-parameter of a packet of one or more Member Streams passed up from the lower layers, in order to discard duplicated packets. The "SequenceHistory" variable maintains a history of the "sequence_number" sub-parameters of recently received packets. During duplicate elimination, "sequence_number" is checked against a history window (defined by "frerSeqRcvyHistoryLength"). Packets being outside the history window are discarded as invalid. Under normal operation, received packets are within the history window and only duplicates are dropped.

IEEE 802.1CB defines a timeout mechanism for the Elimination function in order to cope with some networking scenarios that results in unnecessarily dropped frames (e.g., if Elimination function somehow gets out of step with its corresponding Sequence generation function; if a Sequence generation function is reset; etc.). If a timeout occurs, the history is reset, and it is allowed to accept the next packet by the recovery algorithm, no matter what the value of its "sequence_number" sub-parameter (see "TakeAny" in Section 7.4.3.2.6 in IEEE 802.1CB).

SUMMARY

Some embodiments of the present disclosure are directed to a method for packet or frame replication and elimination in a network. The method includes obtaining by a gate controller downstream information indicating which application instance in an application cluster is downstream active needing to send a stream of packets or frames in a downstream direction through the network. The method further includes, based on the downstream information, controlling by the gate controller a gate within a gate cluster that is associated with the downstream active application instance to be open state which operates to forward the stream of packets or frames in the downstream direction from the downstream active application instance to an associated packet or frame replication entity for replication and transmission via at least two disjoint paths through the network.

Some other embodiments of the present disclosure are directed to a network for packet or frame replication and elimination. The network includes a gate controller adapted to obtain downstream information indicating which application instance in an application cluster is downstream active needing to send a stream of packets or frames in a downstream direction through the network. The gate controller is further adapted to, based on the downstream information, control a gate within a gate cluster that is associated with the downstream active application instance to be open state which operates to forward the stream of packets or frames in the downstream direction from the downstream active application instance to an associated packet or frame replication entity for replication and transmission via at least two disjoint paths through the network.

Potential advantages that may be provided by one or more of these embodiments and further embodiments disclosed herein can include any one or more of the following:

a) The integration of FRER functionality with Cloud environment and Cloud redundancy solutions;
b) The optimization of interactions between Application, FRER, and/or Cloud functions;

c) Ensuring the fulfillment of end-to-end redundancy requirements of time sensitive applications;
d) Avoiding single point of failure within the cloud domain when time sensitive applications are implemented; and
e) The outside world "sees" the whole cloud implementation as a single Talker (Ctrl) with a single FRER entity and multiple connections to the TSN network (cloud internal deployment structure is fully hided).

Other networks and methods according to embodiments will be or become apparent to one with skill in the art upon review of the following drawings and detailed description. It is intended that all such networks and methods be included within this description, be within the scope of the present disclosure, and be protected by the accompanying claims. Moreover, it is intended that all embodiments disclosed herein can be implemented separately or combined in any way and/or combination.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
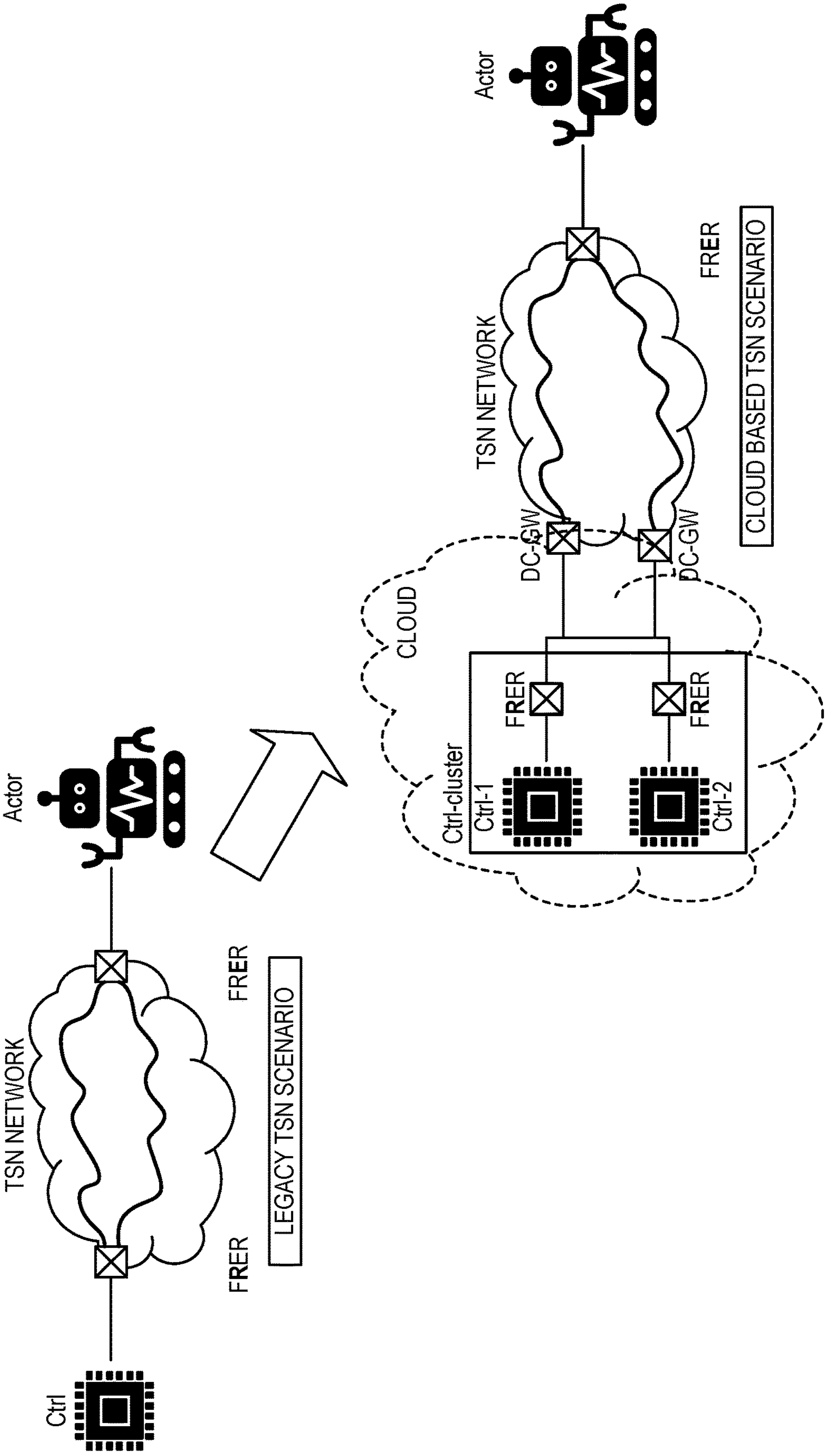
FIG. 1 illustrates a cloud based scenario requiring improvement of Frame Replication and Elimination for Reliability (FRER) functions.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

TSN Node: As used herein, a Time Sensitive Networking (TSN) node is any network node in a TSN network. Examples of a TSN node include a TSN endpoint and a TSN bridge.

There currently exist certain challenge(s) with respect to TSN and Deterministic Networking (DetNet). The mechanisms available for reset of seamless redundancy functions include too many unnecessary packet drops and are not cloud ready. As the ultimate goal of seamless redundancy is to avoid packet loss as much as possible. The unnecessary packet drops due to the operations of a seamless redundancy mechanism should be minimized. Furthermore, moving seamless redundancy (e.g., Institute for Electronics and Electrical Engineering (IEEE)802.1CB) components to a cloud environment creates challenges regarding availability, so seamless redundancy functions are reset much more frequently than in current industrial hardware environments. Therefore, seamless detection and adaptation to scenarios caused by reset of seamless redundancy (e.g., IEEE 802.1CB) functions are essential.

In addition, the above-described history window and timeout mechanism require good design of related parameters. However, these are not trivial tasks as contradicting requirements must be fulfilled. During the history window design, one may intend to select a small window size, for example, in order to protect the Elimination node resources or to protect against bogus packets (security). In contrast, large window size values are more tolerant to network failures and errors. It may be a hard task to find an optimum window size. Similarly, designing a too low timeout parameter value may cause frequent (and unnecessary) reset of the Elimination function. On the other hand, a too large timeout parameter value slows down the recovery after failure scenarios and causes unwanted networking transient. Furthermore, using Frame Replication and Elimination for Reliability (FRER) for bursty (non-Constant Bit Rate (CBR)) streams makes the above design more challenging or even impossible to find a right balance.

In PCT Patent Application International Publication No. WO2021005397A1 (hereinafter referred to as "the '397 Application"), an explicit notification solution is described that is based on a new flag included in the R-TAG, namely the "SeqResetFlag". This flag is set by the Replication function when the sequence generation function was reset, so such events can be recognized easily by the Elimination functions. With this solution, the focus is on the scenario where frames might be dropped unnecessarily (with a high probability) when the sequence generation function was reset. This solution provides a much better solution than IEEE 802.1CB-2017 when the sequence generation function was reset, but it cannot provide fully lossless recovery in all cases. It may result in some dropped packets after the reset event.

Certain aspects of the present disclosure and their embodiments may provide solutions to the aforementioned or other challenges. Systems and methods are described herein that provide seamless recovery for sequence number based seamless redundancy mechanisms after a sequence number generation reset event.

Embodiments of the solution proposed herein target solving the scenario where frames are dropped unnecessarily by IEEE 802.1CB-2017 functions due to the reset of the sequence generation function.

Aspects of the proposed solution include:

1. an explicit notification of the reset event, and
2. adding a new linear initial sequence number space to the existing cyclic sequence number space of IEEE 802.1CB-2017.

Note that the existing cyclic sequence number space of IEEE 802.1CB-2017 is referred to in this document as the "original sequence number space".

Explicit notification of the reset event is based on a flag included in the R-TAG, which is referred to herein as the "SeqResetFlag". The usage of the new linear initial sequence number space (which is referred to herein as "InitSeqNumSpace") is noted via a new flag included in the R-TAG, which is referred to herein as the "InitSeqFlag". Sequence values of the new number space ("InitSeqNumSpace") are also included in the R-TAG.

While the embodiments described herein focus on FRER of TSN, the solutions proposed herein are also applicable to PREF of DetNet or other seamless redundancy mechanisms based on sequence numbering or equivalent functionality (e.g., provided by timestamps).

Embodiments of the solution described herein enable cloudification of seamless redundancy by providing seamless reset for sequence number generation (Sequence generating function) via improvements of, e.g., the Replication and Elimination function of IEEE 802.1CB-2017. In some embodiments, the following aspects are introduced (1) a new flag for explicit indication of the Sequence generating function reset and (2) the use of a new linear initial sequence number space to the existing cyclic sequence number space of, e.g., IEEE 802.1CB-2017. Again, while the description provided herein focuses on FRER as defined in IEEE 802.1CB, the solution described herein is applicable to FRER of TSN, PREF of DetNet, or other seamless redundancy mechanisms based on sequence numbering or equivalent functionality (e.g., provided by timestamps).

There are, proposed herein, various embodiments which address one or more of the issues disclosed herein. Certain embodiments may provide one or more of the following technical advantage(s). Embodiments of the proposed solution described herein enable cloudification of seamless redundancy by providing seamless reset for sequence number generation (Sequence generating function) via improvements of the Replication and Elimination function of IEEE 802.1CB-2017. These improvements ensure much faster and seamless adaptation to network failure scenarios and protect again unnecessary packet drops when sequence generation is reset.

The main motivation for these improvements is to allow cloudification, i.e., "cloud native" implementation of FRER/Packet Replication and Elimination Function (PREF) functions. Today's trend is to move applications towards virtualized environments. This trend has reached applications used in industrial environments as well, see, e.g., edge computing, fog computing. Using FRER/PREF in a cloud-based scenario, where Talkers/Listeners (Sources/Destinations) are moved to the Cloud, creates many additional challenges for the FRER/PREF functions. FRERs/PREFs are TSN/DetNet functions that belong to the endpoints, so FRER/PREF must work inside the Cloud. For example, a FRER/PREF is usually an instance in a controller-cluster (ctrl-cluster) serving an industrial application in a cloud, as illustrated in FIG. 1. In this regard, FIG. 1 illustrates a Cloud based scenario requiring improvement of FRER functions.

Typical Cloud actions like running multiple Virtual Machines (VMs)/containers/instances, creating a VM/container/instance, moving a VM/container/instance, resetting a function, removing a VM/container/instance, etc. require FRER functions to adapt to the changing environment seamlessly. Changes in this environment are much more frequent than in current industrial network scenarios or network deployments without cloud.

High availability systems require the elimination of any single point of failure. Therefore, FRER/PREF functions (i.e., Sequence generation) must be improved to be able to support various Cloud specific redundancy solutions.

Using FRER of IEEE 802.1CB as an example, the impact of the reset of the sequence number generation function depends on the actual value of the sequence_number used for the last packet sent before the reset (noted here as $SN_L$) and the value of the sequence_number used for the first packet sent after the reset (noted here as $SN_R$). According to IEEE 802.1CB-2017, $SN_R$ is always 0 and $SN_L$ is a value in the range of $\{0; \ldots ; GenSeqSpace-1\}$.

The following ranges can be defined to analyze the impact of the reset for (1) the solution described in IEEE 802.1CB-2017, (2) the solution described in the '397 Application, and (3) the solution described herein.

A: $SN_R > SN_L + d$

B: $SN_L + d >= SN_R > SN_L$

C: $SN_L >= SN_R > SN_L - d$

D: $SN_L - d >= SN_R > SN_L - 2d$

Figure 2:
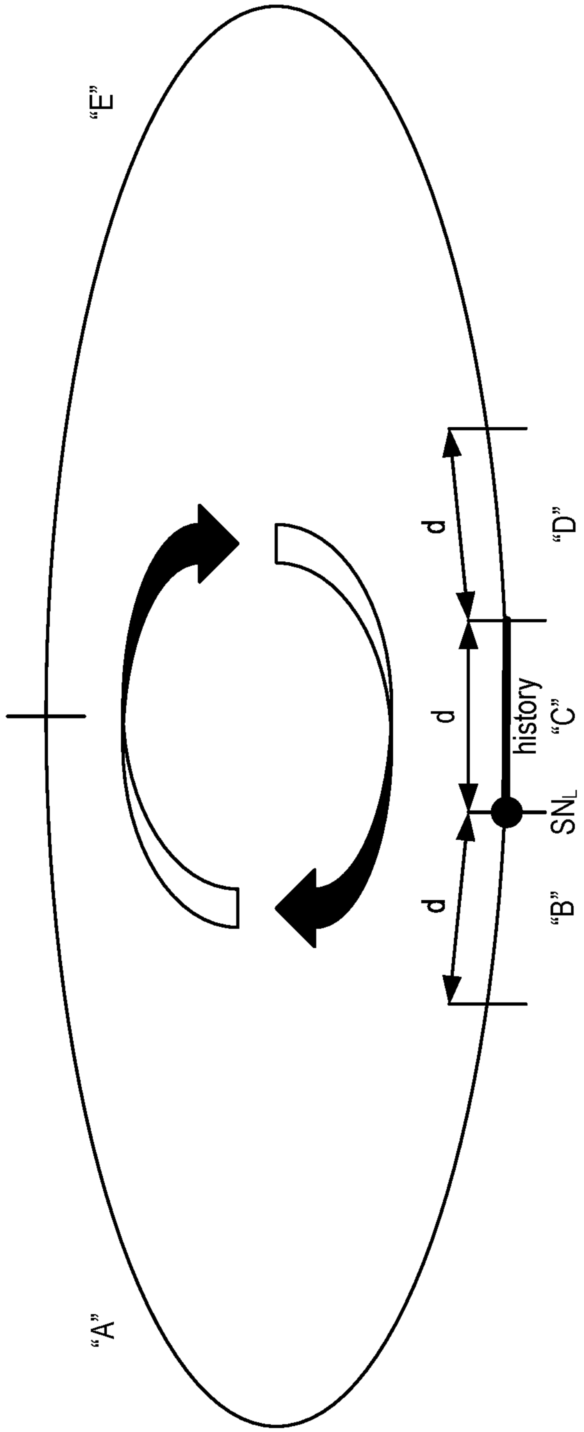
FIG. 2 illustrates ranges of the IEEE 802.1CB-2017 cyclic sequence number space utilized herein for analysis of probability of packet drop.

E: $SN_L - 2d >= SN_R$ where d="frerSeqRcvyHistoryLength" defined in IEEE 802.1CB-2017. Note that due to the cyclic characteristic of the original sequence number space, "A" and "E" are adjacent ranges, where the border between them is be defined here for the analysis as $\text{modulo}_{GenSeqSpace}(SN_L + GenSeqSpace/2)$. FIG. 2 illustrates the ranges of the cyclic sequence number space.

The assumption for the analysis is that (i) there are no other events in the network, only the sequence generation function is reset and (ii) the "frerSeqRcvyHistoryLength" (d) takes value of 100 for the probability calculations.

For the evaluation of the solution described in IEEE 802.1CB-2017, the following range is important:

history window (HSW)={$SN_L$+d; . . . ; $SN_L$−d+1}, where d="frerSeqRcvyHistoryLength".

Note that HSW is practically the merger of range "B" and range "C" used for the evaluation.

As per IEEE 802.1CB-2017, packets with a sequence_number out of the history window (HSW) are dropped and packets within the history window are evaluated against the "SequenceHistory" to decide whether or not they are duplicates. Therefore, IEEE 802.1CB-2017 operates as follows for each of the ranges A-E:

A: packets are dropped until timer expires or the sequence_number of packets reaches $SN_L$+1, B: no packet drop, $SN_R$ is accepted, C: packets are dropped until sequence_number of packets reaches $SN_L$+1, D: packets are dropped until sequence_number of packets reaches $SN_L$+1, E: packets are dropped until timer expires or the sequence_number of packets reaches $SN_L$+1.

That is, there is high probability of packet drop (99.8%) in most cases until timeout triggers the accept of the next packet. Note that packet drop means packet loss for the application whose operation may be damaged by the lost packets.

For the evaluation of the solution described in the '397 Application, the following additional range is important:

reset ignore range (RIR)={$SN_L$+d; . . . ; $SN_L$−2d+1}, where d="frerSeqRcvyHistoryLength"

Note that RIR is practically the merger of range "B", range "C", and range "D" used for the evaluation.

RIR is the range where the Eliminator function ignores the received "SeqResetFlag" and checks the received packet against the HSW. Note that range "D" is also part of RIR, as duplicates over the slower redundancy paths may have a sequence_number below $SN_L$ and can be as low as $SN_L$−d. Therefore, the solution described in the '397 Application behaves as follows for each of the ranges:

A: no packet drop, $SN_R$ accepted,

B: no packets drop, $SN_R$ accepted,

C: packet drop until sequence_number of packets reaches $SN_L$+1,

D: packet drop until sequence_number of packets reaches $SN_L$+1,

E: no packet drop, $SN_R$ accepted.

There is a low probability of packet drop (0.3%) in most cases. When packet drop does happen, it is limited to a maximum of "2d" number of packets after the reset. Some TSN applications may tolerate this when reset occurs, some may not.

The solution described in various disclosed embodiments has the following characteristics for each of the ranges:

A: no packet drop, $SN_R$ accepted,

B: no packet drop, $SN_R$ accepted,

C: no packet drop, $SN_R$ accepted,

D: no packet drop, $SN_R$ accepted,

E: no packet drop, $SN_R$ accepted.

There is no packet drop. Packets sent after the reset are immediately considered valid. TSN applications are not impacted at all, and the implementation impact on FRER nodes is moderate.

Systems and methods are disclosed herein for improving the elimination function in a TSN network using FRER in accordance with IEEE 802.1CB (or likewise in a DetNet network using PREFs. Note that the discussion herein uses IEEE 802.1CB terminology and variable names where appropriate, denoted as "VariableName". New variables, functions, and parameters follow IEEE 802.1CB naming conventions and are denoted as "NewEntityName".

From now on, the description focuses on embodiments of the proposed solution for IEEE 802.11 FRER and as such uses terms and notations as described in 802.1CB-2017 FRER. However, the solution proposed herein is equally applicable to other seamless redundancy mechanisms (e.g., PREF for DetNet) based on sequence numbering or equivalent functionality (e.g., provides by timestamps).

Figure 3:
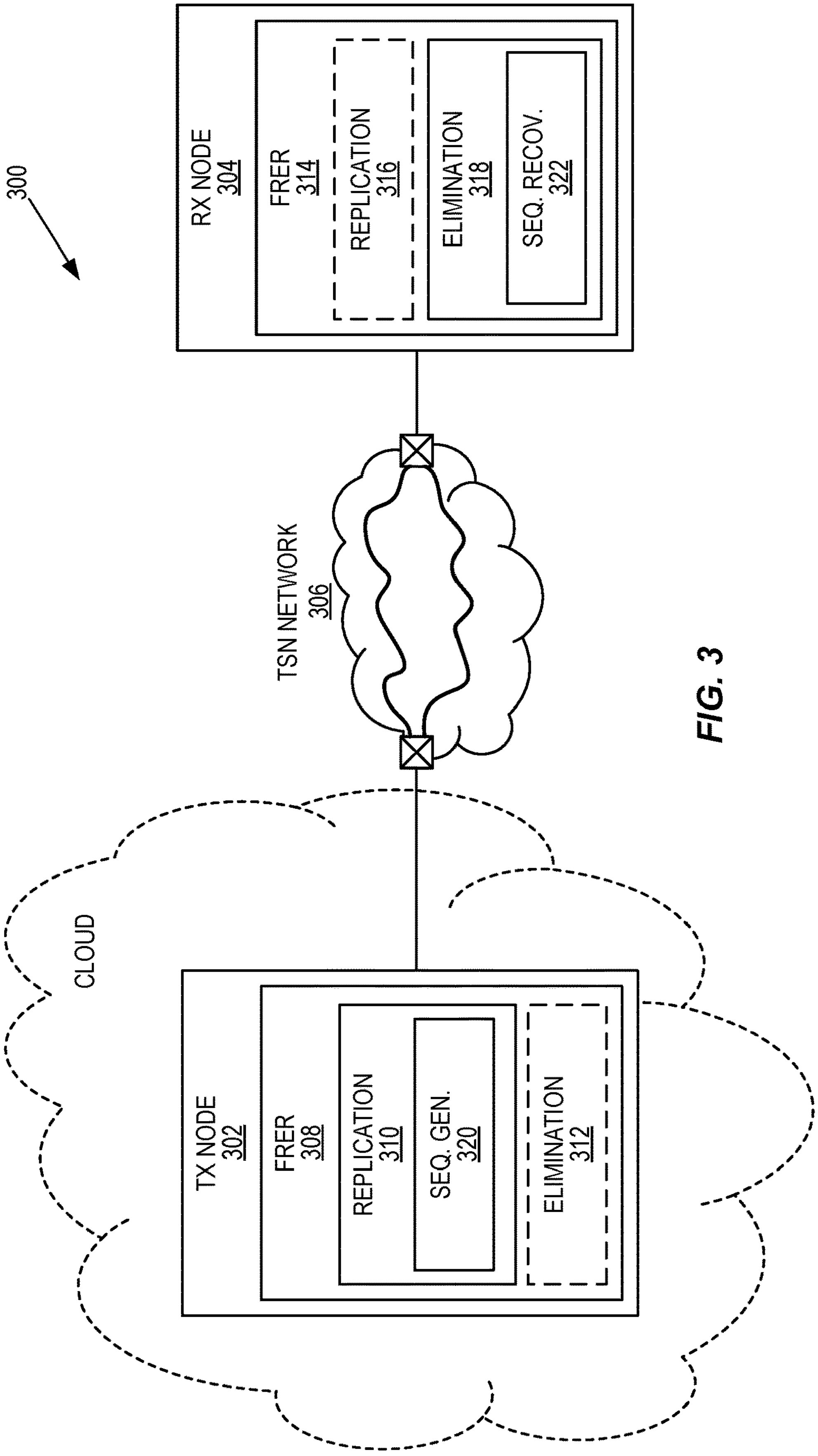
FIG. 3 illustrates a system that includes a transmitting (TX) node and a receiving (RX) node that provide FRER in accordance with embodiments of the present disclosure.

FIG. 3 illustrates a system 300 that includes a transmitting (TX) node 302 and a receiving (RX) node 304 where the TX node 302 transmits a replicated stream of packets to the RX node 304 via a TSN network 306. Note that the TX node 302 and RX node 304 may be, for example, TSN endpoints, TSN bridges, or any other type of TSN node, in this example. Transmission of the replicated stream of packets involves replicating a Stream of packets into multiple Member Streams to thereby provide a Compound Stream. The Member Streams are then transmitted to the RX node 304 via the TSN network 306 via maximally disjoint paths. Note that while the nodes 302 and 304 are denoted herein as "TX node" and "RX node", respectively, it should be understood that these nodes may both transmit and receive streams via the TSN network 306.

As illustrated, the TX node 302 includes a FRER function 308 that operates to provide FRER in accordance with, in this example, IEEE 802.1CB. The FRER 308 includes a Replication function 310 and an Elimination function 312 (illustrated as optional in the sense that it is not used for transmission of the Stream to the RX node 304). In a similar manner, the RX node 304 includes a FRER function 314 that operates to provide FRER in accordance with, in this example, IEEE 802.1CB. The FRER 314 includes a Replication function 316 (illustrated as optional in the sense that it is not used for reception of the Stream from the TX node 302) and an Elimination function 322.

As illustrated, the Replication function 310 includes a Sequence Generation function 320. The Sequence Generation function 320 operates to generate sequence numbers for the packets in the packet Stream. The Elimination function 318 includes a Sequence Recovery function 322. The Sequence Recovery function 322 operates on packets passed up the protocol stack towards the higher layer functions and uses the sequence number sub-parameter to decide which packets to pass and which to discard.

In some embodiments, the TX node 302 is part of a Cloud implementation (e.g., part of a Ctrl-cluster as described above with respect to FIG. 1).

A Sequencing function of the FRERs 308 and 314 provides the "sequence_number" sub-parameter for FRER functions. In particular, the Sequencing function has two kinds of component functions: (1) a Sequence Generation function (e.g., the Sequence Generation function 320) that operate on packets passed down the protocol stack towards the physical layer and generates a value for the sequence_number sub-parameter and (2) a Sequence Recovery function (e.g., the Sequence Recovery function 322) that operates on packets passed up the protocol stack towards the higher layer functions and uses the sequence_number sub-parameter of the received packets to decide which packets to pass and which to discard.

Embodiments of the solution described herein use the flag introduced by the '379 Application to the R-TAG, namely the "SeqResetFlag". This flag is used as follows:

- When transmitting the Stream of packets, the Replication function 310 at the TX node 302 does not change the "SeqResetFlag" value of the packet if a Redundancy Tag (R-TAG) is already included in the header of the packet (i.e., in the header of the corresponding Ethernet frame).
- The Replication function 310 at the TX node 302 sets the "SeqResetFlag" (e.g., sets the "SeqResetFlag" value=1) for a given time period or for a number of sent packets when the Sequence Generation function 320 is reset.
- The Replication function 310 at the TX node 302 clears the "SeqResetFlag" (e.g., sets the "SeqResetFlag" value=0) in all other cases.

Figure 4:
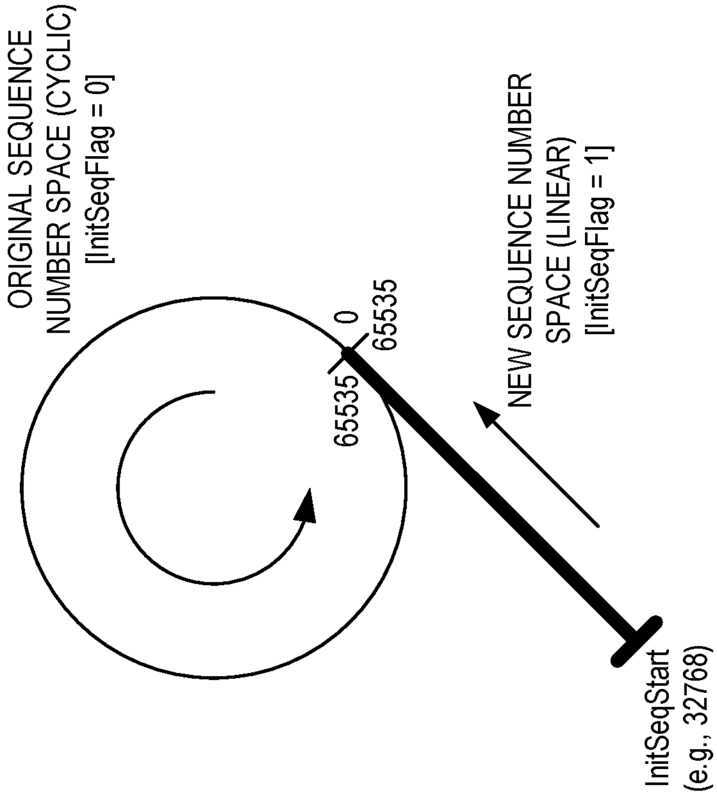
FIG. 4 illustrates an example of a relation of a new (linear) sequence number space and the original (cyclic) sequence number space utilized for FRER in accordance with embodiments of the present disclosure.

Embodiments of the solution described herein introduce a new additional sequence number space, which is referred to herein as "InitSeqNumSpace", which is used after initialization or reset of the Sequence Generation function 320. The newly introduced InitSeqNumSpace is illustrated by the bolded linear sequence number space in FIG. 4. The sequence_number of the next packet is stored in a new variable, namely the "InitGenSeqNum". When this new number space is exhausted, the Sequence Generation function 320 starts to use the original sequence number space, which is illustrated by the non-bolded sequence number space in FIG. 4. In other words, FIG. 4 illustrates an example of the relation of the new (linear) sequence number space and the original (cyclic) sequence number space.

Embodiments of the solution described herein introduce a new flag in the R-TAG, which is referred to as the "InitSeqFlag". This flag is used by the Replication function 310 at the TX node 302 as follows:

- For each packet in the Stream of packets being transmitted by the TX node 302, the Replication function 310 does not change the "InitSeqFlag" value of the packet if R-TAG is already included in the header of the packet.
- The Replication function 310 sets the "InitSeqFlag" (e.g., sets the "InitSeqFlag" value=1) when the Sequence Generation function 320 is initialized or reset. The "InitSeqNumSpace" is used by the Replication function 310 to generate the sequence number for the packet.
- The Replication function 310 clears the "InitSeqFlag" (e.g., sets the "InitSeqFlag" value=0) in all other cases.

The "InitSeqNumSpace" is used as follows:

- "InitSeqNumSpace" is a linear sequence number space starting with "InitSeqStart" (e.g., a configurable parameter set to, in the example of FIG. 4) 32768 and ends with "GenSeqSpace−1" (i.e., 65535 as per IEEE 802.1CB-2017).
- "InitSeqNumSpace" has its own set of variables that are used to deal with the sequence_number of packets. Note that the InitSeqNumSpace variable names are derived from the variable names of the original sequence number via appending them with an "Init" prefix, e.g., "InitGenSeqNum", "InitRecovSeqNum", "InitSequenceHistory", "InitTakeAny", "InitRemainingTicks", etc.

The Replication function 310 at the TX node 302 uses the "InitSeqNumSpace" as follows:

- "UseInitSeqSpace" is a Boolean state variable showing that the new "InitSeqNumSpace" (value=1) has to be used by Sequence Generation function 320 to generate the sequence_number for the next packet.
- Whenever the Sequence Generation function 320 is initialized or reset, "UseInitSeqSpace" is set (e.g., value=1) to show that "InitSeqNumSpace" must be used to generate the sequence_number for sent packets.
- All packets sent with sequence_number from "InitSeqNumSpace" have in their R-Tag the "InitSeqFlag" set (e.g., value=1).
- "InitGenSeqNum" takes the value of "InitSeqStart" whenever the Sequence Generation function 320 is initialized or reset, and incremented by 1 when a packet is sent.
- When "InitGenSeqNum" is incremented and becomes greater than its maximum value, "UseInitSeqSpace" is cleared (e.g., value=0) to show that "InitSeqNumSpace" cannot be used. The Sequence Generation function 320 then uses the original sequence number space for the next packet.
- If "UseInitSeqSpace" is clear (value=0), the Sequence Generation function 320 uses "GenSeqNum" to generate the sequence_number of the next packets (i.e., the original sequence number space is used).

Embodiments of the solution herein define a new procedure for the Elimination function 318 at the RX node 304 as well. It uses the new set of variables to handle packets containing sequence_number from the above described "InitSeqNumSpace". The size of the history window is same for both sequence number spaces. The Elimination function 318 operates as follows upon receiving a packet from one of the Member Streams of the Stream transmitted by TX node 302:

- If the "InitSeqFlag" flag in the received packet is set (e.g., value=1), the Sequence Recovery function 322 uses the new linear sequence number space (InitSeqNumSpace) related variables the following way:
  - The Sequence Recovery function 322 sets "InitRecovSeqNum" to the "sequence_number" of the packet and clears the "InitSequenceHistory", if the "SeqResetFlag" is set and "sequence_number" of the packet is out of the iRIR range {"InitRecovSeqNum"+"frerSeqRcvyHistoryLength"; . . . ; "InitRecovSeqNum"−2×"frerSeqRcvyHistoryLength"+1}. Note that the range has to be calculated according to the borders of the new linear sequence number space.
  - The Sequence Recovery function 322 ignores the "SeqResetFlag" if the "sequence_number" of the packet is within the iRIR range. If the "sequence_number" is out of the iHSW range {"InitRecovSeqNum"+"frerSeqRcvyHistoryLength"; . . . ; "InitRecovSeqNum"-"frerSeqRcvyHistoryLength"+1} packet is dropped. If it is within iHSW, then it is checked whether or not the packet has been already received.

The Sequence Recovery function 322 does not change the “SeqResetFlag” and “InitSeqFlag” value of the packet.

The Sequence Recovery function 322 sets the “TakeAny” variable of the original sequence number space if the “sequence_number” of the packet is in the following range {“GenSeqSpace”–“frerSeqRcvyHistoryLength”; . . . ; “GenSeqSpace”–2× “frerSeqRcvyHistoryLength” }. Note that this range shows that the new initial sequence number space is soon exhausted, i.e., approaching the original sequence number space.

If the “InitSeqFlag” flag in the received packet is clear (value=0), the sequence recovery function uses the original sequence number space related variables.

The Sequence Recovery function 322 sets the “RecovSeqNum” to the value of the “sequence_number” of the packet and clears the “SequenceHistory” if the “SeqResetFlag” is set and the “sequence_number” of the packet is out of the RIR range {“RecovSeqNum”+“frerSeqRcvyHistoryLength”; . . . ; “RecovSeqNum”–2× “frerSeqRcvyHistoryLength”+1}. Note that the range has to be calculated according to the modulo rules of the original sequence number space.

The Sequence Recovery function 322 ignores the “SeqResetFlag” if the “sequence_number” of the packet is within the RIR range. If the “sequence_number” is out of the HSW range, packet is dropped. If it is within HSW, then checked whether or not the packet has been already received.

The Sequence Recovery function 322 does not change the “SeqResetFlag” value of the packet.

Note that the timeout mechanism for the sequence recovery—to accept the next packet, no matter what the value of its sequence_number subparameter (see “TakeAny” variable in 802.1CB-2017 for the original sequence number space)—is not changed and applied for both sequence number spaces.

An implementation may use two variables to enable/disable the use of the reset flag (“UsingResetFlag”=I/O (enable/disable)) and the new initial sequence number space (“UsingInitSpace”=I/O (enable/disable)).

Figure 5:
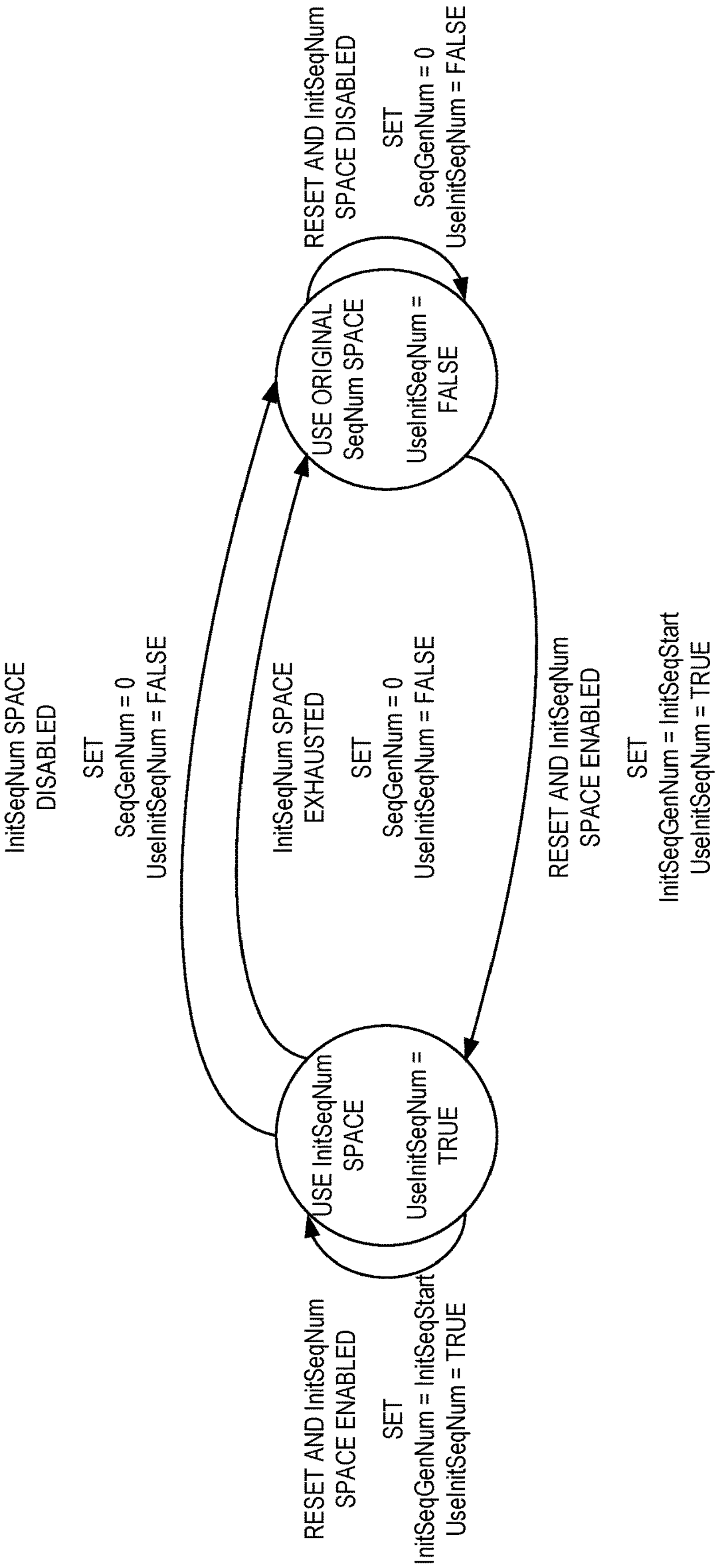
FIG. 5 illustrates a state diagram for a replication function at the TX node in accordance with one embodiment of the present disclosure.

FIG. 5 illustrates a state diagram for the Replication function 310 at the TX node 302 in accordance with one embodiment of the present disclosure. As illustrated, when in a first state in which the Replication function 310 uses the original sequence number space and UsingInitSpace=False, the Replication function 310 uses the original sequence number space. Upon reset with the initial sequence number space disabled, the Replication function 312 sets SeqGenNum=0 and UseInitSeqNum=False and remains in the first state. However, upon reset with the initial sequence number space enabled, the Replication function 310 sets InitSeqGenNum=InitSeqStart and UseInitSeqNum=True and transitions to a second state in which the Replication function 310 uses the initial sequence number space. While in the second state, upon reset with the initial sequence number space enabled, the Replication function 310 sets InitSeqGenNum=InitSeqStart and UseInitSeqNum=True and remains in the second state in which the Replication function 310 uses the initial sequence number space. While in the second state, upon exhausting the initial sequence number space, the Replication function sets SeqGenNum=0 and UseInitSeqNum=False and transitions to the first state in which the Replication function uses the original sequence number space. While in the second state, upon the initial sequence number space being disabled, the Replication function sets SeqGenNum=0 and UseInitSeqNum=False and transitions to the first state in which the Replication function uses the original sequence number space.

Figure 6:
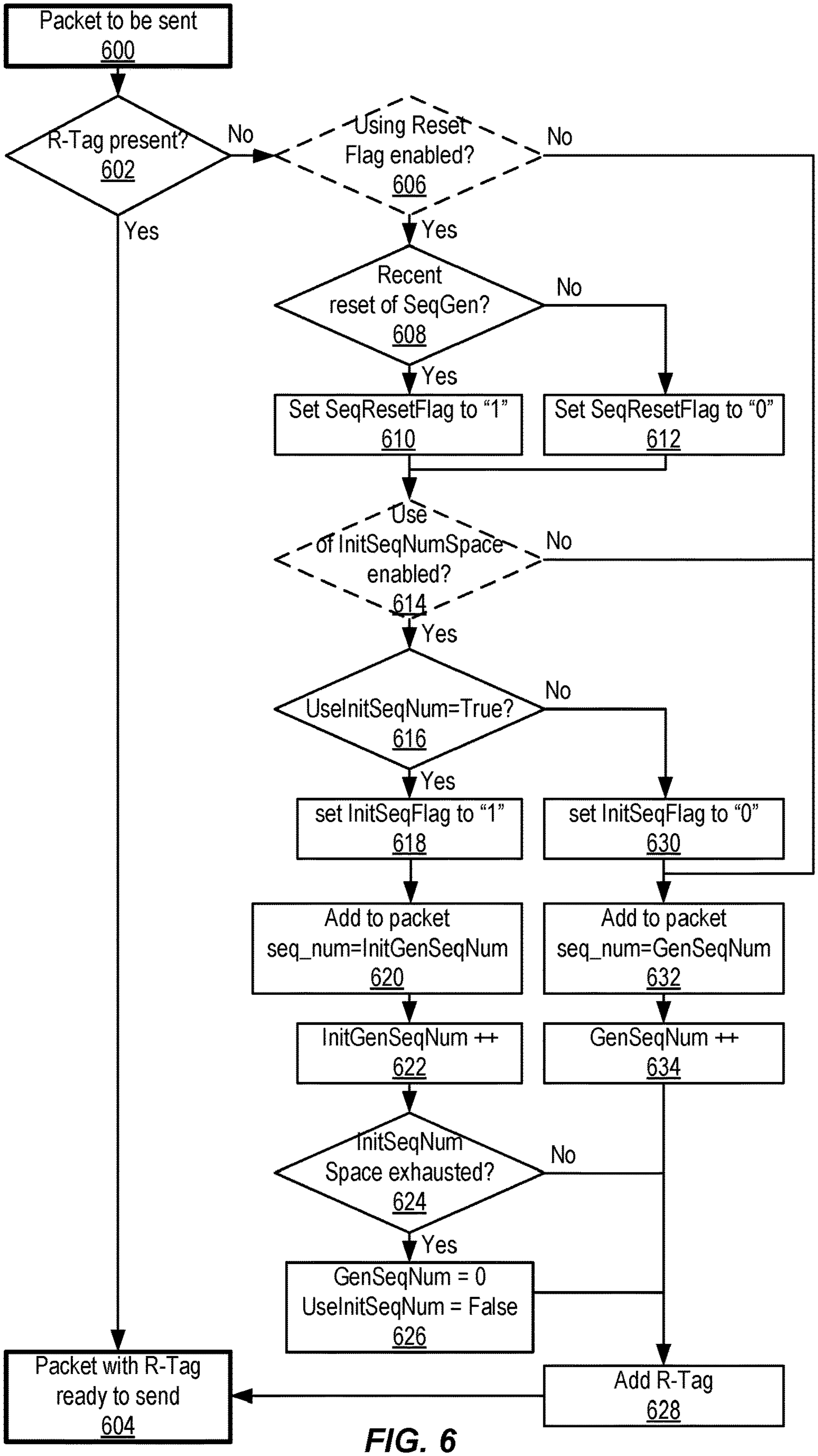
FIG. 6 is a flow chart that illustrates the operation of the replication function at the TX node in accordance with one embodiment of the present disclosure.

FIG. 6 is a flow chart that illustrates the operation of the Replication function 310 at the TX node 302 in accordance with one embodiment of the present disclosure. Optional steps are represented with dashed lines. As illustrated, the Replication function 310 receives a packet (e.g., from a higher layer(s) in the protocol stack) to be sent (step 600). The Replication function 310 determines whether the R-Tag is present or set in the packet (step 602). If so (602, YES), the packet with the R-Tag set is ready to be sent, and as such provided to a lower layer in the protocol stack for transmission (step 604). For instance, multiple copies of the packet may then be generated and sent via different (e.g., disjoint) paths through the TSN network 306. If the R-Tag is not present or set in the packet (step 602, NO), the Replication function 310 determines whether the “UsingResetFlag” is enabled (step 606). If so, the Replication function 310 determines whether the Sequence Generation function 320 has recently been reset (step 608). This is true if a reset has occurred within a predefined or preconfigured amount of time prior to receiving the packet (i.e., the current time) or within a predefined or preconfigured number of packets prior to the receiving the packet. If the Sequence Generation function 320 has recently been reset (step 608, YES), the Replication function 310 enables the “SeqResetFlag” (e.g., set it to a value of “1”) (step 610). Otherwise, the Replication function 310 disables the “SeqResetFlag” (e.g., sets it to a value of “0”) (step 612).

Whether proceeding from step 610 or step 612, the Replication function 310 determines whether use of “InitSeqNumSpace” is enabled (step 614). If not (614, NO), the process proceeds to step 632, which is described below. Otherwise (step 614, YES), the Replication function 310 determines whether “UseInitSeqNum” is enabled (e.g., set to “True”) (step 616). If so (step 616, YES), the Replication function 310 enables “InitSeqFlag” (e.g., sets it to “1”) (step 618), adds a sequence number (seq_num) equal to “InitGenSeqNum” to the packet (step 620), increments “InitGenSeqNum” (step 622), and determines whether the “InitSeqNumSpace” is exhausted (step 624). If not (step 624, NO), the process proceeds to step 628, which is described below. Otherwise (step 624, YES), the Replication function 310 sets “GenSeqNum” equal to “0” and sets “UseInitSeqNum” to False (step 626). Then, whether proceeding from the “NO” branch of step 624 or step 626, the Replication function 310 adds an R-Tag to the packet (step 628) and the procedure proceeds to step 604 where the packet is ready to send.

Returning to step 616, if “UseInitSeqNum” is not set to “TRUE”, the Replication function 310 disables the “initSeqFlag” (e.g., sets it to “0”) (step 630), adds a sequence number (seq_num) equal to “GenSeqNum” to the packet (step 632), and increments “GenSeqSum” (step 634). The procedure then proceeds to step 628 where an R-Tag is added to the packet and then the packet is ready to be sent.

Figure 7:
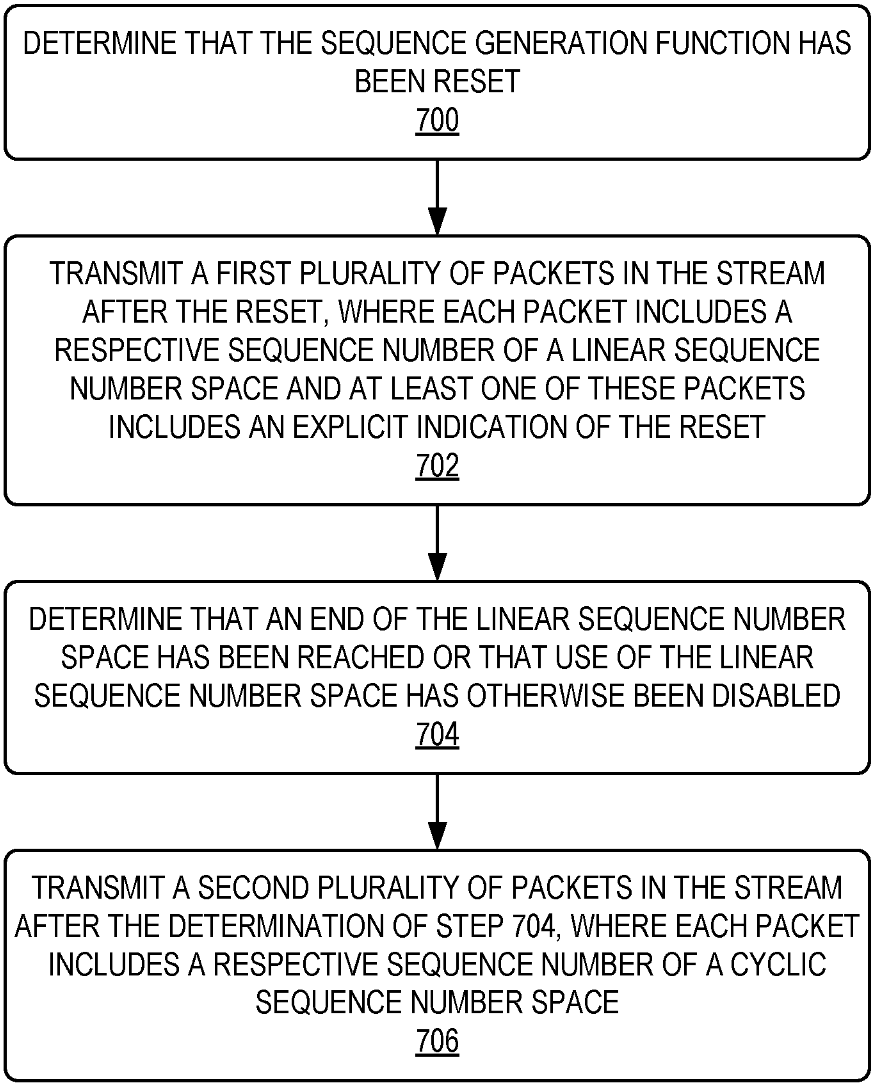
FIG. 7 is a flow chart that illustrates the operation of the replication function at the TX node in accordance with another embodiment of the present disclosure.

FIG. 7 is a flow chart that illustrates the operation of the Replication function 310 at the TX node 302 in accordance with another embodiment of the present disclosure. This embodiment is similar to that of FIG. 6. As illustrated, the Replication function 310 determines that the sequence generation function 310 at the TX node 302 has been reset (step 700). Responsive to determining that the sequence generation function 310 at the TX node 302 has been reset, the Replication function 310 transmits a first plurality of packets in a Stream of packets, wherein: (a) each of the first plurality of packets comprises a respective sequence number from a linear sequence number space and (b) at least a first packet from among the first plurality of packets that was sent after the rest further comprises an explicit indicator of the reset (step 702). The Replication function 310 determines that an end of the linear sequence number space has been reached or that use of the linear sequence number space has been otherwise disabled (step 704). Responsive to determining that the end of the linear sequence number space has been reached or that use of the linear sequence number space has been otherwise disabled, the Replication function 310 transmits a second plurality of packet in the Stream of packets, wherein (a) each of the second plurality of packets comprises a respective sequence number of a cyclic sequence number space (step 706).

In one embodiment, each of the first plurality of packets further comprises an explicit indication that the linear sequence number space is being used.

In one embodiment, the network is a TSN network. Further, in one embodiment, the method further comprises resetting the sequence generation function 310, wherein resetting the sequence generation function 310 comprises resetting a sequence number history, a history window (e.g., resetting "RecovSeqNum", which is the midpoint of the history window), or both the sequence number history and the history window. In one embodiment, the steps of determining (700) that the sequence generation function 310 at the TX node 302 has been reset, transmitting (702) the first plurality of packets in the Stream of packets, determining (704) that the end of the linear sequence number space has been reached or that use of the linear sequence number space has been otherwise disabled, and transmitting (706) the second plurality of packet in the Stream of packets are performed by the FRER function 308 of the TX node 302 and, more specifically, by the Replication function 310 of the TX node 302.

In another embodiment, the network is a DetNet network. Further, in one embodiment, the steps of determining (700) that the sequence generation function 310 at the TX node 302 has been reset, transmitting (702) the first plurality of packets in the Stream of packets, determining (704) that the end of the linear sequence number space has been reached or that use of the linear sequence number space has been otherwise disabled, and transmitting (706) the second plurality of packet in the Stream of packets are performed by a PRER of the TX node 302.

Figure 8:
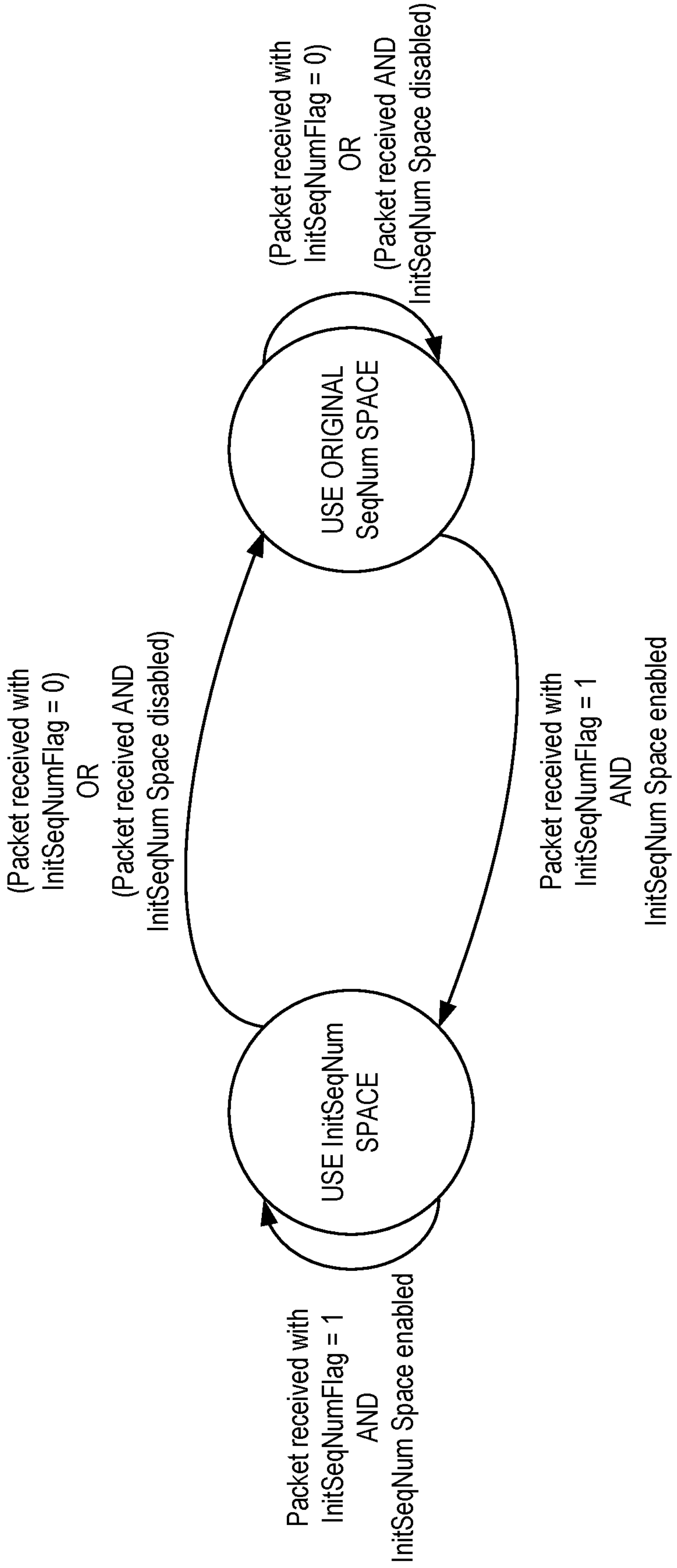
FIG. 8 illustrates a state diagram for an elimination function at the RX node in accordance with one embodiment of the present disclosure.

FIG. 8 illustrates a state diagram for an example embodiment of the Elimination function 318 at the RX node 304. As illustrated, when in a first state, the Elimination function 318 uses the original sequence number space. When in the first packet state and a packet is received with InitSeqNumFlag=0 or a packet is received and the initial sequence number space is disabled, the Elimination function 318 remains in the first state. However, when in the first state and a packet is received with InitSeqNumFlag=1 and the initial sequence number space enabled, the Elimination function 318 transitions to a second state in which the Elimination function 318 uses the initial sequence number space. When in the second state and a packet is received with InitSeqNumFlag=1 and the initial number sequence is enabled, the Elimination function 318 remains in the second state. When in the second state and a packet is received with InitSeqNumFlag=0 or a packet is received and initial sequence number space is disabled, the Elimination function 318 transitions to the first state.

Figure 9A:
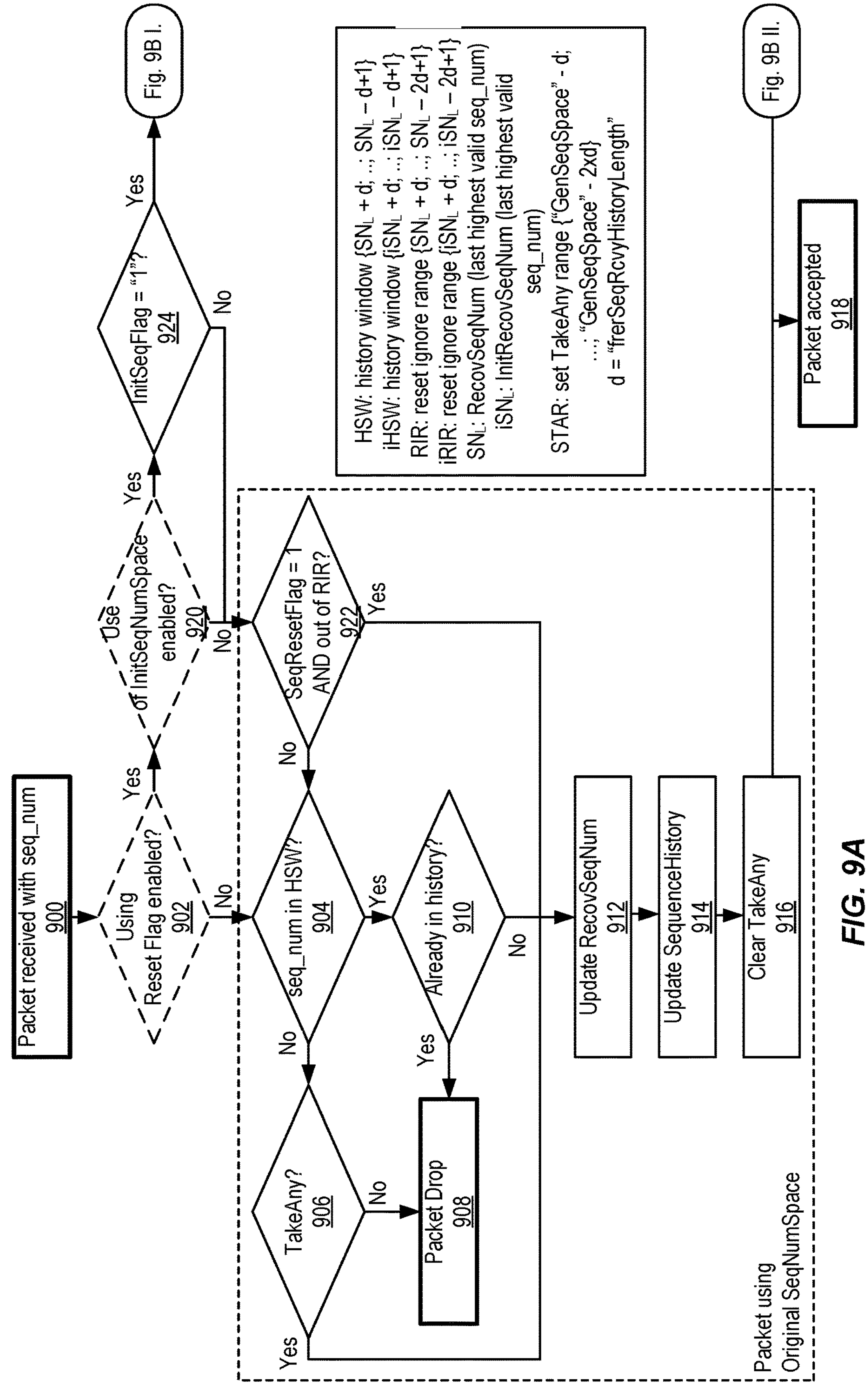
FIGS. 9A and 9B provide a flow chart that illustrates the operation of the elimination function at the RX node according to one embodiment of the present disclosure.
Figure 9B:
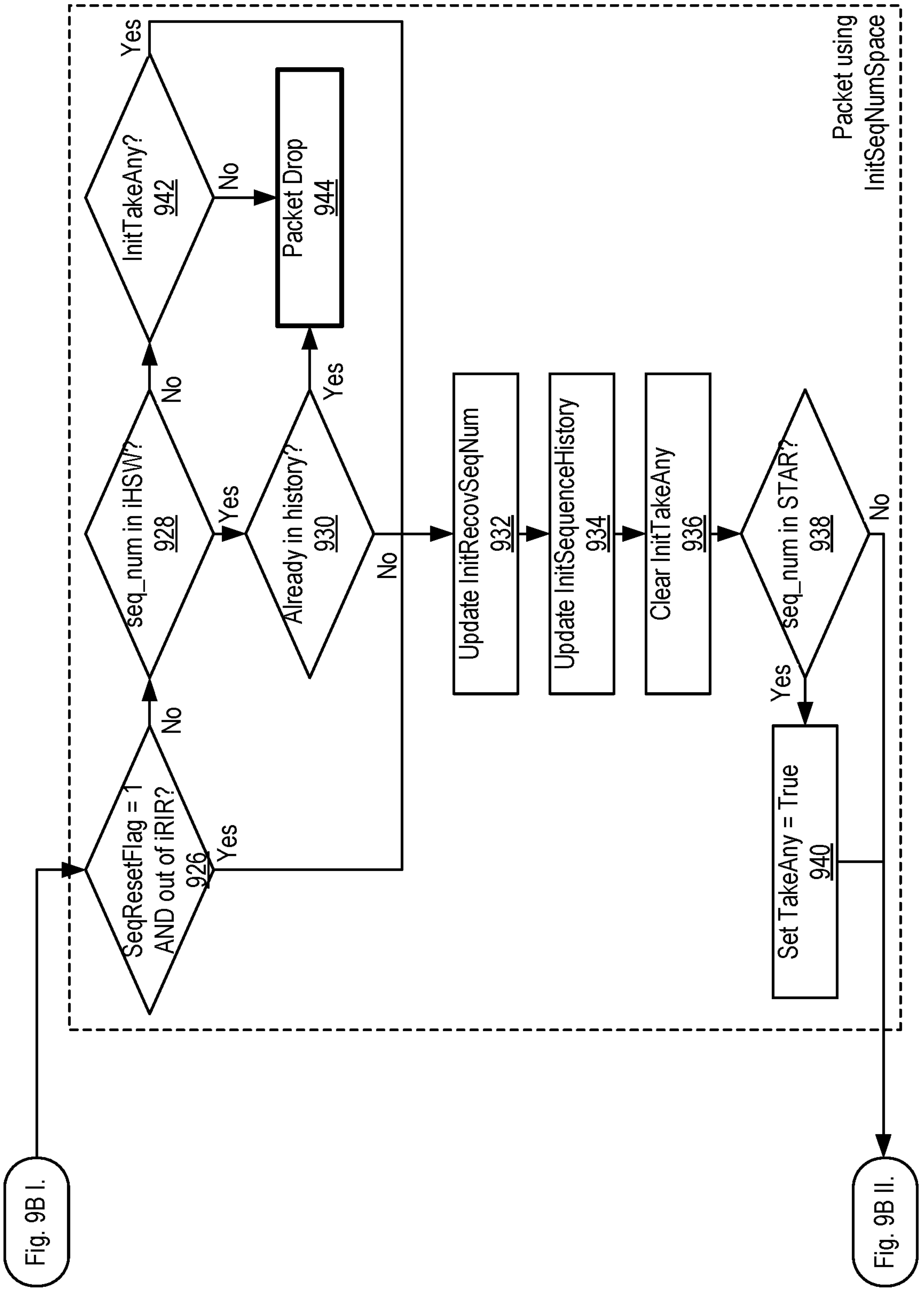

FIGS. 9A and 9B provide a flow chart that illustrates the operation of the Elimination function 318 at the RX node 304 according to one embodiment of the present disclosure. Optional steps are represented with dashed lines. As illustrated, the Elimination function 318 receives a packet (e.g., from a lower layer(s) in the protocol stack) to be processed (step 900). The packet has a "seq_num" value. The Elimination function 318 determines whether the "UsingResetFlag" is enabled (step 902). If not (step 902, NO), the Elimination function 318 determines whether the sequence number of the packet is in the history window (HSW) (step 904). If not (step 904, NO), the Elimination function 318 determines whether "TakeAny" is enabled (step 904). If not (step 906, NO), the Elimination function 318 drops the packet (step 908). Otherwise, if "TakeAny" is enabled (step 906, YES), the procedure proceeds to step 912, which is described below. Returning to step 904, if the sequence number of the packet is in the HSW (step 904, YES), the Elimination function 318 determines whether the sequence number of the packet is already in the history (step 910). If so (step 910, YES), the Elimination function 318 drops the packet (step 908). Otherwise, if the sequence number of the packet not already in the history (step 910, NO), the procedure proceeds to step 912, which is described below.

Returning to step 902, if "UsingResetFlag" is enabled (step 902, YES), the Elimination function 318 determines whether use of "InitSeqNumSpace" is enabled (step 920). If not (step 920, NO), the Elimination function 318 determines whether "SeqResetFlag" is enabled and the sequence number of the received packet is out of the RIR (step 922). If not (step 922, NO), the procedure proceeds to step 904. Otherwise (step 922, YES), the procedure proceeds to step 912.

Whether proceeding from the YES branch of step 906, the NO branch of step 910, or the YES branch of step 922, the Elimination function 318 then updates the "RecovSeqNum" (step 912), updates the "SequenceHistory" (step 914), clears "TakeAny" (step 916), and accepts the packet (step 918).

Returning to step 920, if use of "InitSeqNumSpace" is enabled (step 920, YES), the Elimination function 318 determines whether "InitSeqFlag" is enabled (step 924). If not (step 924, NO), the process proceeds to step 922. Otherwise (step 924, YES), the Elimination function 318 determines whether "SeqResetFlag" is enabled and the sequence number of the received packet is out of iRIR (step 926). If so (step 926, YES), the procedure proceeds to step 932, which is described below. Otherwise (step 926, NO), the Elimination function 318 determines whether the sequence number of the packet is in iHSW (step 928). If so (step 928, YES), the Elimination function 318 determines whether the packet is already in history (step 930). If no (step 930), the procedure proceeds to step 932. Otherwise (step 932, NO), the Elimination function 318 drops the packet (step 944). Returning to step 928, if the sequence number of the packet is not in iHSW (step 928, NO), the Elimination function 318 determines whether "InitTakeAny" is enabled (step 942). If not (step 942, NO), the Elimination function 318 discards the packet (step 944). Otherwise (step 942, YES), the process proceeds to step 932.

Whether proceeding from the YES branch of step 926, the NO branch of step 930, or the YES branch of step 942, the Elimination function 318 updates the "InitRecovSeqNum" (step 932), updates "InitSequenceHistory" (step 934), and clears "InitTakeAny" (step 936). The Elimination function 318 determines whether the sequence number is in STAR (i.e., the range {"GenSeqSpace"−d; . . . ; "GenSeqSpace"−2× d}) (step 938). If so (step 938, YES), the Elimination function 318 sets "TakeAny" to TRUE (step 940) and the packet is accepted (step 918). Otherwise (step 938, NO), the Elimination function 318 accepts the packet (step 918).

One possible option to encode the "SeqResetFlag", the "InitSeqFlag", and the "new sequence number belonging to the linear sequence number space" in the R-TAG are described in the following:

- in the reserved field (2nd and 3rd bytes of the R-TAG), and/or
- in the Sequence Number field (4th and 5th bytes of the R-TAG).

Figure 10:
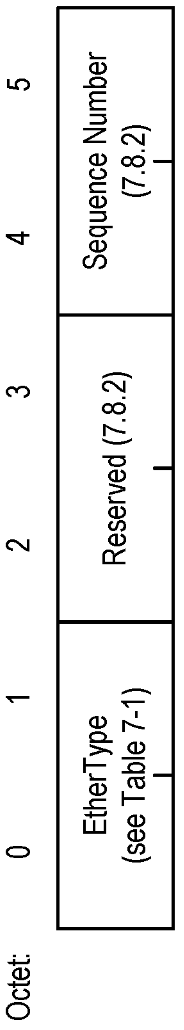
FIG. 10 illustrates the R-TAG format in accordance with IEEE 802.1CB and in which a "SeqResetFlag", a "InitSeqFlag", and a "new sequence number belonging to the linear sequence number space" may be encoded in accordance with one embodiment of the present disclosure.

In FIG. 10, which illustrates the R-TAG format (FIG. 7-4 in IEEE 802.1CB):

- "SeqResetFlag" and "InitSeqFlag" can be encoded in the R-TAG using 2 bits of the reserved field, one bit for each flag. As per 802.1CB-2017: "This field shall be transmitted with all zeros and shall be ignored on receipt." The "new sequence number belonging to the linear sequence number space" can be encoded in the Sequence Number field of the R-TAG. "InitSeqFlag" indicates how to interpret the Sequence Number field.

Other encoding methods can be constructed as well. For example, "SeqResetFlag" can be encoded in the R-TAG using the reserved fields using 1 bit, and the "new sequence number belonging to the linear sequence number space" can be encoded in the remaining 15 bits of the reserved fields. Such an encoding includes the information of the sequence number space as well, so no need to explicitly encode the "InitSeqFlag".

Figure 11:
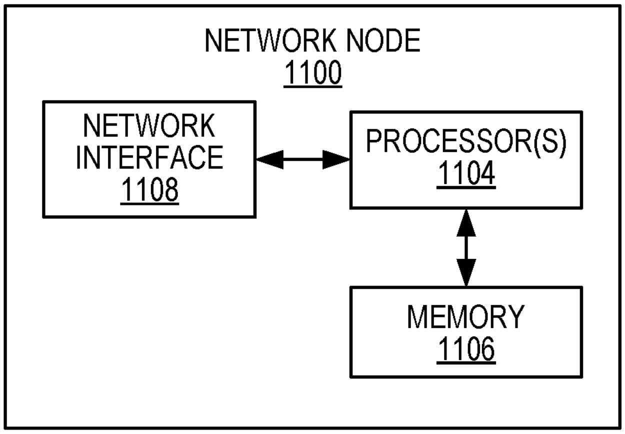
FIGS. 11, 12, and 13 are schematic block diagrams of a network node.

FIG. 11 is a schematic block diagram of a network node 1100 according to some embodiments of the present disclosure. The network node 1100 may be the TX node 302 or the RX node 304 described above. As illustrated, the network node 1100 includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. The one or more processors 1104 operate to provide one or more functions of the network node 1100 as described herein (e.g., one or more functions of the TX node 302 or one or more functions of the RX node 304, as described herein). In some embodiments, the function(s) are implemented in software that is stored, e.g., in the memory 1106 and executed by the one or more processors 1104.

Figure 12:
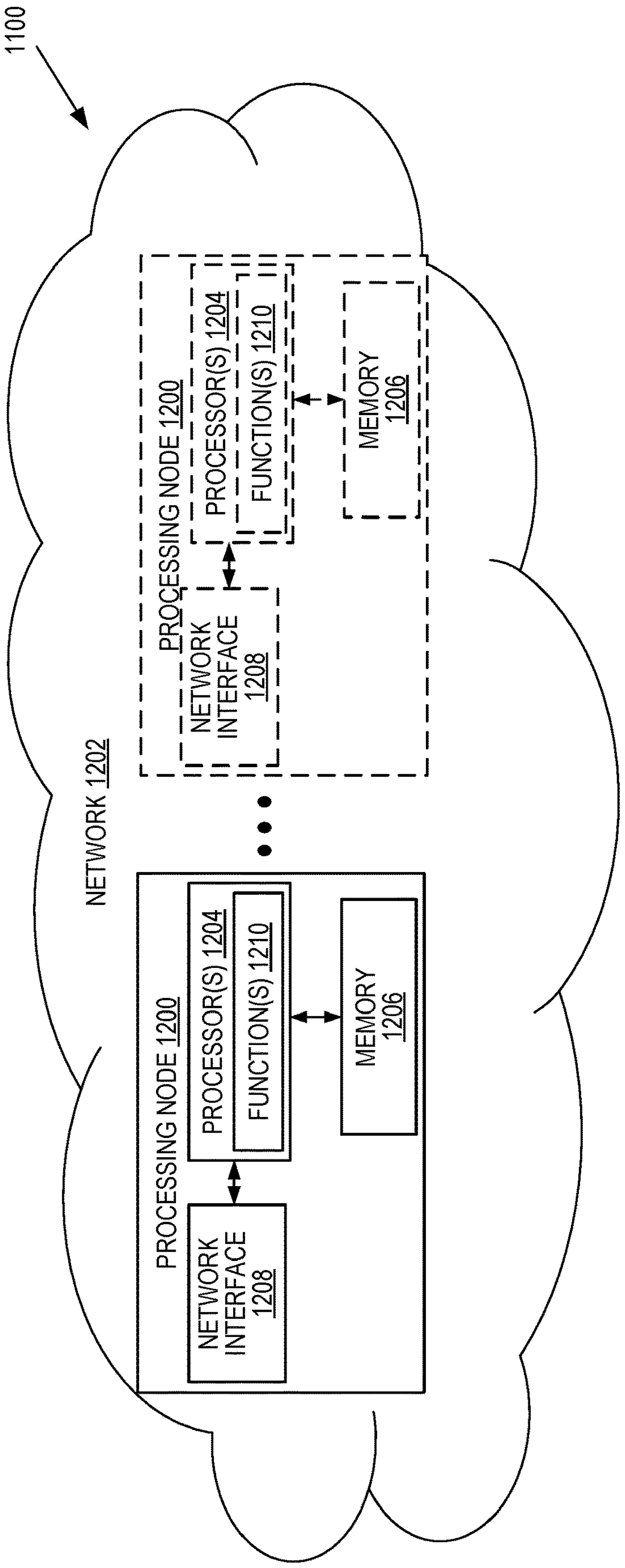

FIG. 12 is a schematic block diagram that illustrates a virtualized embodiment of the network node 1100 according to some embodiments of the present disclosure. This discussion is equally applicable to other types of network nodes. Further, other types of network nodes may have similar virtualized architectures. Again, optional features are represented by dashed boxes.

As used herein, a "virtualized" network node is an implementation of the network node 1100 in which at least a portion of the functionality of the network node 1100 is implemented as a virtual component(s) (e.g., via a virtual machine(s) executing on a physical processing node(s) in a network(s)). As illustrated, in this example, the network node 1100 includes one or more processing nodes 1200 coupled to or included as part of a network(s) 1202. Each processing node 1200 includes one or more processors 1204 (e.g., CPUs, ASICs, FPGAS, and/or the like), memory 1206, and a network interface 1208. In this example, functions 1210 of the network node 1100 described herein (e.g., one or more functions of the TX node 302 or one or more functions of the RX node 304, as described herein) are implemented at one of the processing nodes 1200 or distributed across two or more of the processing nodes 1200 in any desired manner. In some particular embodiments, some or all of the functions 1210 of the network node 1100 described herein are implemented as virtual components executed by one or more virtual machines implemented in a virtual environment(s) hosted by the processing node(s) 1200.

In some embodiments, a computer program including instructions which, when executed by at least one processor, causes the at least one processor to carry out the functionality of the network node 1100 or a node (e.g., a processing node 1200) implementing one or more of the functions 1210 of the network node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
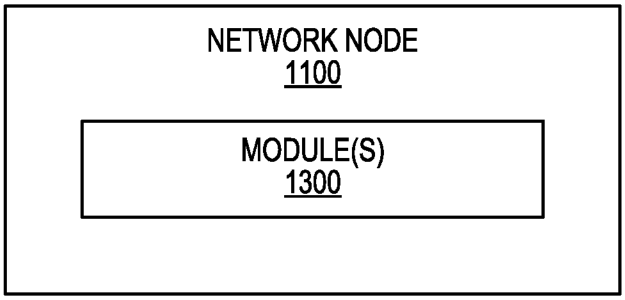

FIG. 13 is a schematic block diagram of the network node 1100 according to some other embodiments of the present disclosure. The network node 1100 includes one or more modules 1300, each of which is implemented in software. The module(s) 1300 provide the functionality of the network node 1100 304 described herein (e.g., one or more functions of the TX node 302 or one or more functions of the RX node 304, as described herein). This discussion is equally applicable to the processing node 1200 of FIG. 12 where the modules 1300 may be implemented at one of the processing nodes 1200 or distributed across multiple processing nodes 1200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Other embodiments of the present disclosure are directed to providing gate controlled FRER and/or PRER for implementation in a cloud environment. These embodiments are now described below.

Moving industrial applications to a cloud environment is a challenging task. Redundancy solutions developed for cloud environment mainly focus on broadband services and need to be adapted for industrial scenarios having much stronger requirements. In the transport network between the cloud and the industrial endpoint, special functions (FRER)

were developed by IEEE 802.1 to meet the reliability requirements of the industrial applications. Cloud specific reliability solutions must be compatible with the FRER-domain. Some embodiments of the present disclosure are directed to a system and operations for enabling adaptation of cloud reliability and FRER functions of the transport domain.

In the cloud environment it is quite usual that single point of failure is avoided by implementing multiple instances of an application. When combined with a transport domain using FRER, the FRER domain is used also within the Cloud environment, such as shown in FIG. 1. These application instances can be served by multiple FRER entities in a Cloud environment (Ctrl-cluster). If an application instance fails the Controller-cluster can e.g., activate another application instance. However, such a change of the actual active application instance should be seamless in the FRER domain. The outside world intends to "see" the whole cloud implementation as a single Talker (Ctrl) with a single FRER entity and multiple connections to the TSN network, which may be achieved with prior known approaches.

The mechanisms available for reset of redundancy functions include too many unnecessary packet drops and are not cloud ready. As the ultimate goal of seamless redundancy is to avoid packet loss as much as possible, the unnecessary packet drops due to the operations of a redundancy mechanism should be minimized. Furthermore, moving seamless redundancy (e.g., IEEE 802.1CB) components to a cloud environment creates challenges regarding availability, as the reset of functions is much more frequent than in current industrial hardware environments. Therefore, seamless detection and adaptation to scenarios caused by reset of redundancy (e.g., IEEE 802.1CB) functions are essential.

Some embodiments of the present disclosure are directed to utilizing additional functions to enable effective FRER functionalities in a cloud environment and allow the combination/integration of FRER functionalities with cloud specific redundancy functions.

In some embodiments, gate functionality is provided between the application instances and the FRER entities, and which forwards/blocks packets towards or from FRER entities based on gate control information (open or close). Timeout functionality in FRER entities is provided to reset the Sequence generation function, when no packets were received for a given time period. It is noted that reset of Sequence generation function can be achieved by other operations as well. These new functions allow seamless interaction between cloud specific redundancy solutions and the connected packet network using FRER.

Figure 14:
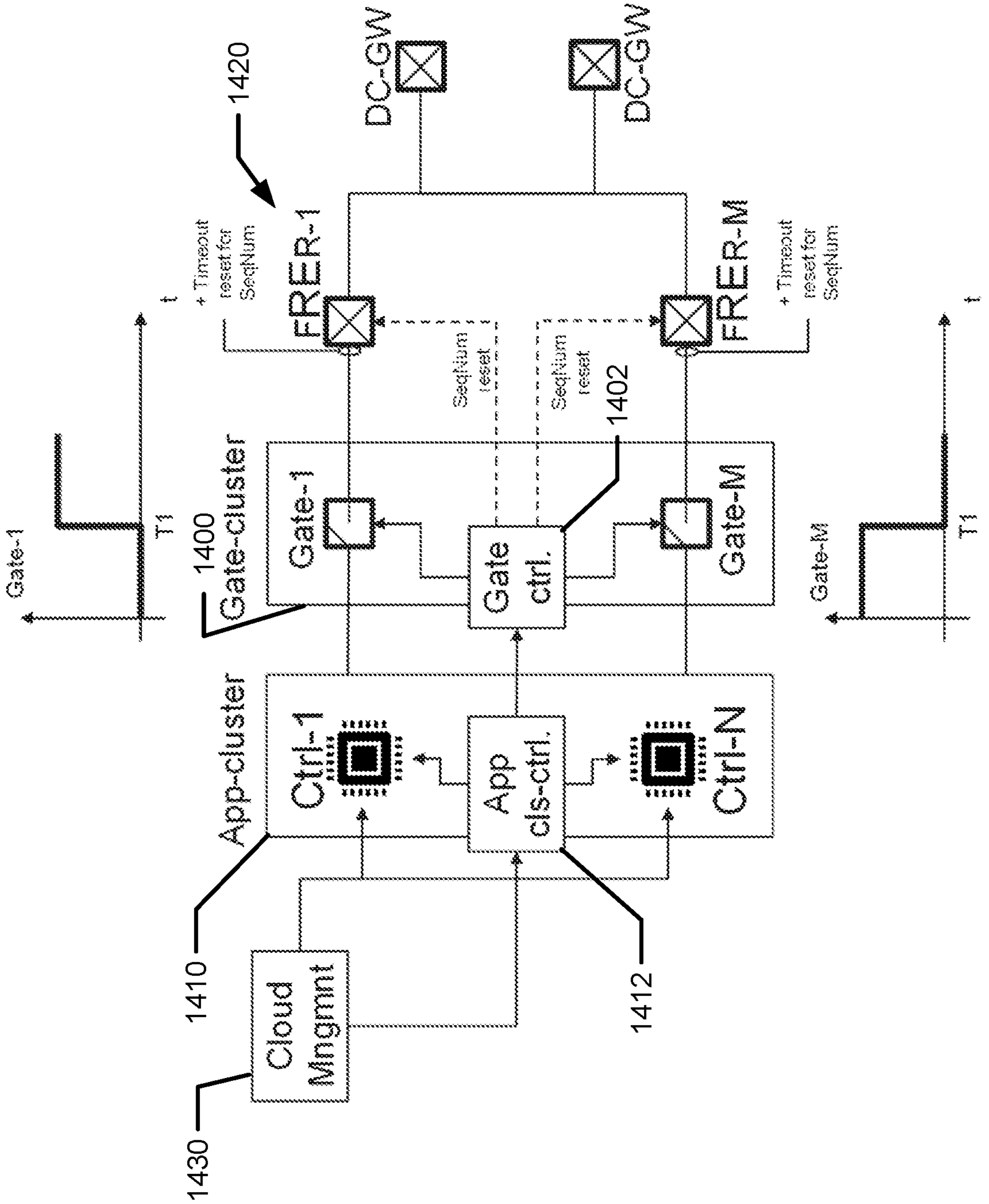
FIG. 14 illustrates a system that includes Gate-cluster elements that provide selective connections between an Application-cluster and FRER entities in accordance with some embodiments of the present disclosure.

FIG. 14 illustrates a system that includes a plurality of gates (i.e., Gate-1 to Gate-M) within a Gate cluster 1400 ("Gate-cluster") that provide selective connections between a plurality of application instances (i.e., Ctrl-1 to Ctrl-N) executing in an Application cluster 1410 ("App-cluster") and a plurality of FRER entities (i.e., FRER-1 to FRER-M) in an FRER entity domain 1420 in accordance with some embodiments of the present disclosure. The Gate cluster 1400 is connected between the Application cluster 1410 and the FRER entity domain 1420. Frame forwarding (or packet forwarding) is either allowed or blocked between the Application cluster 1410 and a given (e.g., selected) FRER entity (i.e., one of FRER-1 to FRER-M) in the domain 1420 according to the open or close state of the corresponding Gate (e.g., one of Gate-1 . . . Gate-M) in the Gate cluster 1400. The Gate states are controlled (driven) by a Gate controller 1402 ("Gate ctrl."). The Gate controller 1402 responds to various defined types of information by opening or closing selected ones of the Gates, e.g., such as responsive to Application-cluster state(s). In some embodiments, the information indicates states of the application instances as being one of: downstream active needing to send a stream of packets or frames in a downstream direction through the network; downstream inactive not needing to send a stream of packets or frames in a downstream direction through the network; upstream active needing to receive a stream of packets or frames in an upstream direction from the network; and upstream inactive no needing to receive a stream of packets or frames in an upstream direction from the network.

A Cloud Management ("Cloud Mngmnt") (orchestrator) 1430 controls the operation and maintenance of application instances in the Application cluster 1410. An application instance may not be aware of other application instances.

An Application Cluster Controller (ACC) 1412 (also "App cls-ctrl.") selects the downstream active application, that provides the application's output packet flow, i.e., the input for the FRER entity 1420. The ACC 1412 informs about its selection (provides notification of the selection) to the Gate controller 1402 (e.g., indicating which application instance is downstream active at a given time or during a time-period).

The Gate controller 1402 sets the gate open or close states according to the received information from the ACC 1412. In some or all embodiments, there is only a single gate operated in open state for forwarding packets or frames in a stream from a downstream active application instance, as a given TSN Stream, towards the FRER domain 1420 at any given time, therefore, only one FRER entity receives packets or frames from the application cluster 1410. The Gate controller 1402 may trigger the open FRER in the FRER domain 1420 operating in the downstream direction to reset its sequence number generation function, which can also be called "sequence generation function", (e.g., via the frerSeqRcvyReset managed object (802.1 CB-2017, Section 10.4.1.4)).

GATE-x, which can be any of the illustrated Gate-1 through Gate-M, forwards or blocks packet or frame forwarding depending upon the open or closed state, respectively. GATE-x can be implemented as a standalone function (not integrated with FRER) or integrated in FRER Sequencing function (802.1CB-2017, Section 7.4)

FRER entities (i.e., FRER-1 to FRER-M) in the FRER domain 1420 provide the replication and/or elimination function to create and/or merge the TSN member Streams. The FRER entities 1420 can be implemented according to one or more of the embodiments described above. As will be described in further detail below, a FRER entity may support a new TimeOutBasedSequenceGenerationReset function. The FRER entity resets its Sequence generation function if no input frames were received for a given (threshold) time interval by the FRER entity for a given TSN Stream. Using TimeOutBasedSequenceGenerationReset function is optional and depends on the system design.

Potential advantages that may be provided by one or more of the embodiments disclosed herein can include any one or more of the following:

f) The integration of FRER functionality with Cloud environment and Cloud redundancy solutions;
g) The optimization of interactions between Application, FRER, and/or Cloud functions;
h) Ensuring the fulfillment of end-to-end redundancy requirements of time sensitive applications;
i) Avoiding single point of failure within the cloud domain when time sensitive applications are implemented; and j) The outside world "sees" the whole cloud implementation as a single Talker (Ctrl) with a single FRER entity and multiple connections to the TSN network (cloud internal deployment structure is fully hided).

The term "downstream" direction refers to forwarding a TSN Stream from the application instance (the "downstream active application instance") towards the actor(s). The term "upstream" direction refers to forwarding a TSN Stream forwarded from the actor towards the application instance(s) (the "upstream active application instance(s)".

Figure 15:
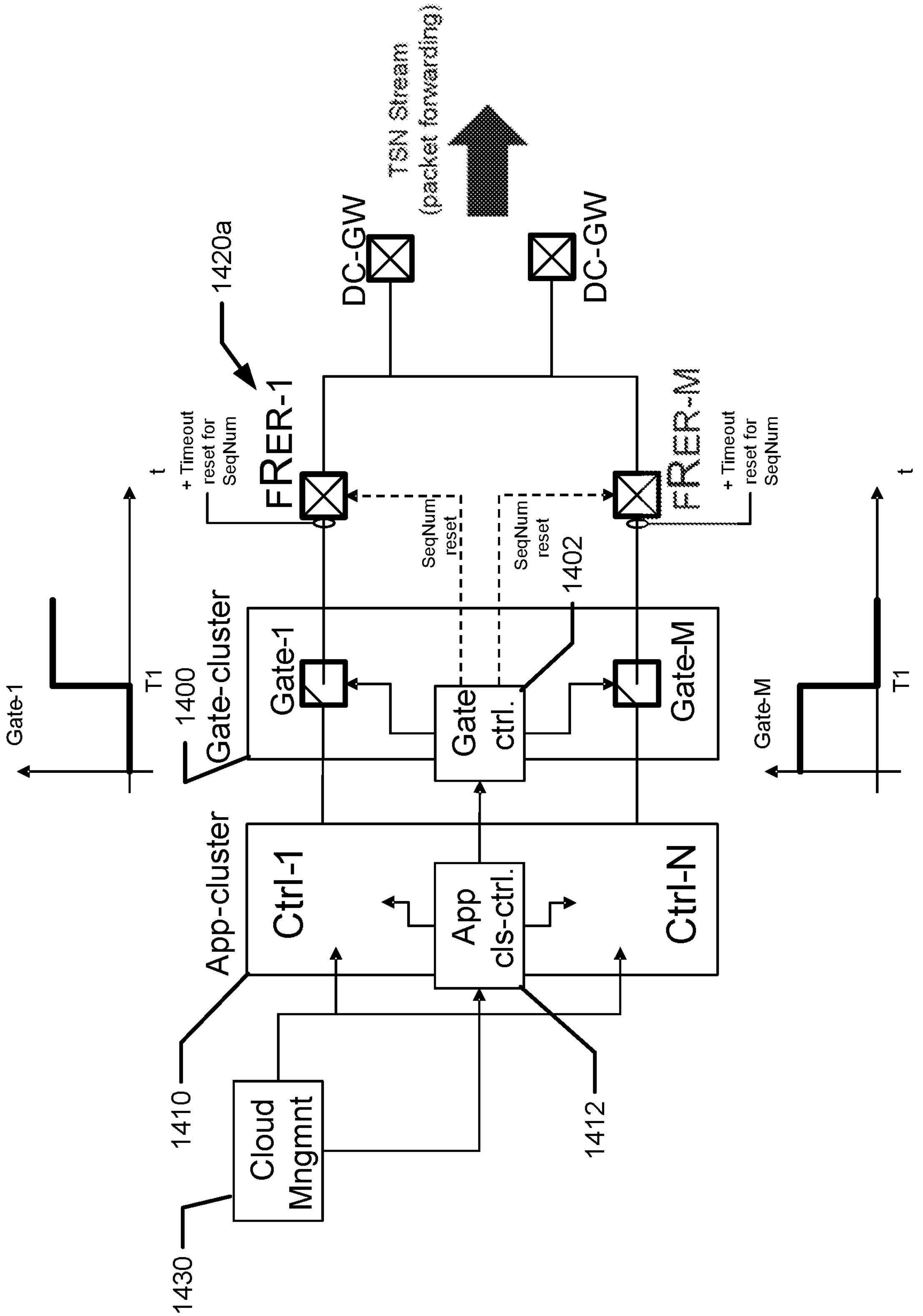
FIG. 15 illustrates the system of FIG. 14 which is adapted for forwarding TSN streams in a downstream direction in accordance with some embodiments of the present disclosure.

Forwarding of TSN streams in the downstream direction from a downstream active application instance towards one or more actors is now described in the context of FIG. 15. FIG. 15 illustrates the system of FIG. 14 which is adapted for forwarding TSN streams in the downstream direction in accordance with some embodiments of the present disclosure.

Referring to FIG. 15, the Cloud Management 1430 creates the necessary or desired application instances in the Application-cluster 1410. Each application instance can operate as a Talker that generates a downstream TSN Stream. Each application instance can create packets which control one or more actors. Redundancy of application instances is controlled by the Application-Cluster Controller (ACC) 1412. For example, the ACC 1412 may create a plurality of redundant application instances that are concurrently executing in the application cluster 1410. The ACC 1412 selects which application instance output should be forwarded towards the Frame Replication for Reliability (FRER) entity 1420*a*, which may correspond to a packet or frame replication pathway through the FRER entity domain 1400 of FIG. 14. The application instance that is selected for outputting is referred to as a downstream active application instance. In accordance with some embodiments, the ACC 1412 selects only a single downstream active application instance (e.g., Ctrl-1) that will be allowed to stream packets or frames to an associated one of the Gates (e.g., Gate-1) that is controlled to be open state which operates to forward packets or frames flowing in the downstream direction from the downstream active application instance to an associated packet or frame replication entity (e.g., FRER-1) entity 1420*a* for communication through the network.

Figure 17:
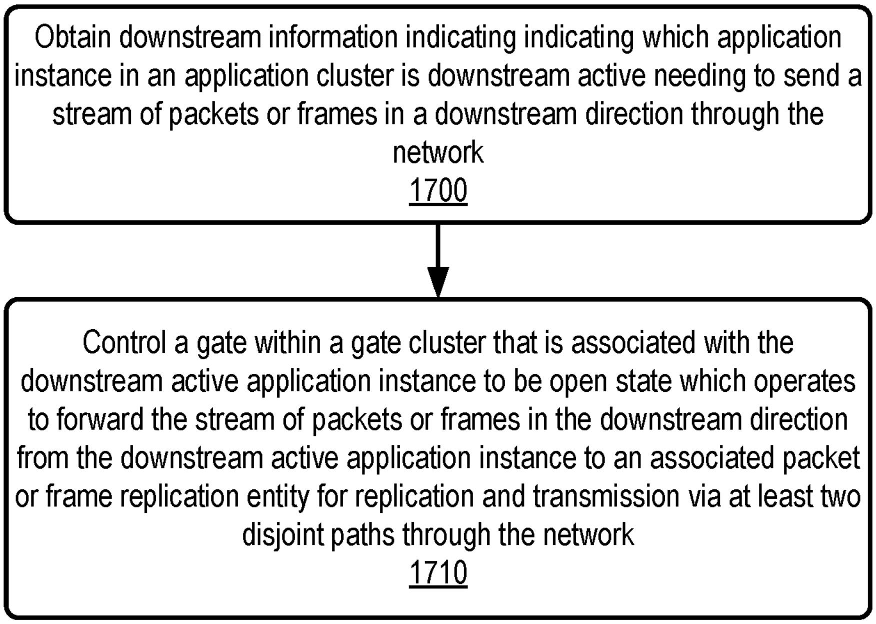
FIGS. 17 and 18 are flowcharts of operations that can be performed by a gate controller in accordance with some embodiments of the present disclosure.

Corresponding operations by the gate controller 1402 are now described in the context of the flowchart of FIG. 17, in accordance with some embodiments. Referring to FIG. 17, the gate controller 1402 obtains 1700 downstream information indicating which application instance in the application cluster 1410 is downstream active needing to send a stream of packets or frames in a downstream direction through the network. Based on the downstream information, the gate controller 1402 control 1710 a gate within the gate cluster 1400 that is associated with the downstream active application instance to be open state which operates to forward the stream of packets or frames in the downstream direction from the downstream active application instance to an associated packet or frame replication entity 1420*a* for replication and transmission via at least two disjoint paths through the network.

The packet or frame replication entity 1420*a* replicates the packets or frames in the stream received from the gate associated with the downstream active application instance to create Time-Sensitive Networking (TSN) streams for transmission via the at least two disjoint paths through the network.

In a further embodiment, the control operation 1710 to change any of the gates between different ones of the open and closed states based on the downstream information is performed in a time synchronized manner, i.e., so that the gates which are controlled to switch states concurrently perform the state switching.

In some embodiments, the control operation 1710 to control the gate within the gate cluster 1400 that is associated with the downstream active application instance to be open state, operates to allow only a single one of the gates in the gate cluster 1400 to be in the open state at a time which operates to forward the stream of packets or frames in the downstream direction to the associated packet or frame replication entity 1420*a* for replication and transmission via the at least two disjoint paths through the network.

Output packets of the downstream active application instance (e.g., Ctrl-1) are forwarded by the associated one of the Gates (e.g., Gate-1) to the associated packet or frame replication entity (e.g., FRER-1) entity 1420*a*, which provides a defined level of packet or frame replication for communication through the network in the downstream direction. There is a Gate-x positioned before each FRER entity. In at least some embodiments, each Gate is associated with only a single FRER entity in a one-to-one association. A single Gate-x may be fed packets from multiple application instances executing in the application cluster 1410. The ACC 1412 informs the Gate controller 1402 about its decision regarding which application instance output should be forwarded towards the FRER entity 1420*a*. The Gate-controller 1402 drives the Gates responsive to the received information. In some or all embodiments, in the downstream direction there is only a single one of the Gates that is open (allowing packets to flow through to an associated (connected) one of the FRER entities) for a given TSN Stream at any given time, all the other Gates are closed. It is implementation dependent how to achieve that a change between the open and the closed Gate states happens at the same time for all affected Gates. In one embodiment, the Gates are controlled in a time synchronized manner, e.g., based on a common synchronization clock.

The FRER entity 1420*a* operates as the entry point to the FRER domain 1420. The FRER entity 1420*a* adds the sequence number information to the packet(s) received from the corresponding open Gate. For example, FRER-1 adds sequence number information to packet(s) received from open state Gate-1. When there is a change regarding which Gate is open, e.g., Gate-1 is closed and Gate-M is opened, the Sequence generation function of the FRER entity 1420*a* that serves the newly opened Gate (e.g., FRER-M serving Gate-M) must be reset. This reset can be triggered by the Gate controller 1402 (e.g., via the frerSeqRcvyReset managed object (802.1 CB-2017, Section 10.4.1.4)). Alternatively, reset can be done in the FRER entity 1420*a* (e.g., FRER-M) by supporting a new functionality (TimeOutBasedSequenceGenerationReset). The FRER entity 1420*a* (e.g., FRER-M) resets the Sequence generation function if no input frames were received for a given time by the FRER entity 1420*a* (e.g., FRER-M) for a given TSN Stream. Reset of Sequence generation function should or must happen before changing the corresponding gate state from closed to open (e.g., the Sequence generation function is reset before Gate-M is changed from closed to open state).

Accordingly, with the reference to the embodiments of FIGS. 15 and 17, the gate controller 1402 can operate to trigger the packet or frame replication entity 1420*a* to reset a sequence number generation function 320 based on the downstream information. In a further embodiment, the gate controller 1402 and/or another node (e.g., the application cluster controller 1412) can operate to identify which one of the gates within the gate cluster 1400 is associated with the downstream active application instance and needs to be controlled 1710 by the gate controller 1402 to be open state, and can trigger the packet or frame replication entity 1420*a*, which is associated with the identified gate, to reset the sequence number generation function 320. In a further embodiment, the operation to trigger the packet or frame replication entity 1420*a*, which is associated with the identified gate, to reset the sequence number generation function 320 is performed before the identified gate is controlled to change from a closed state to the open state. In another embodiment, the gate controller 1402 can operate to trigger the packet or frame replication entity 1420*a* to reset the sequence number generation function 320 using a frerSeqRcvyReset managed object. In another embodiment, the gate controller 1402 can operate to trigger the packet or frame replication entity 1420*a* to reset the sequence number generation function 320 responsive to no packets or frames being received by the packet or frame replication entity 1420*a* in a threshold time interval.

The gate controller 1402 and the gate cluster 1400 may be part of the FRER domain 1420.

Figure 16:
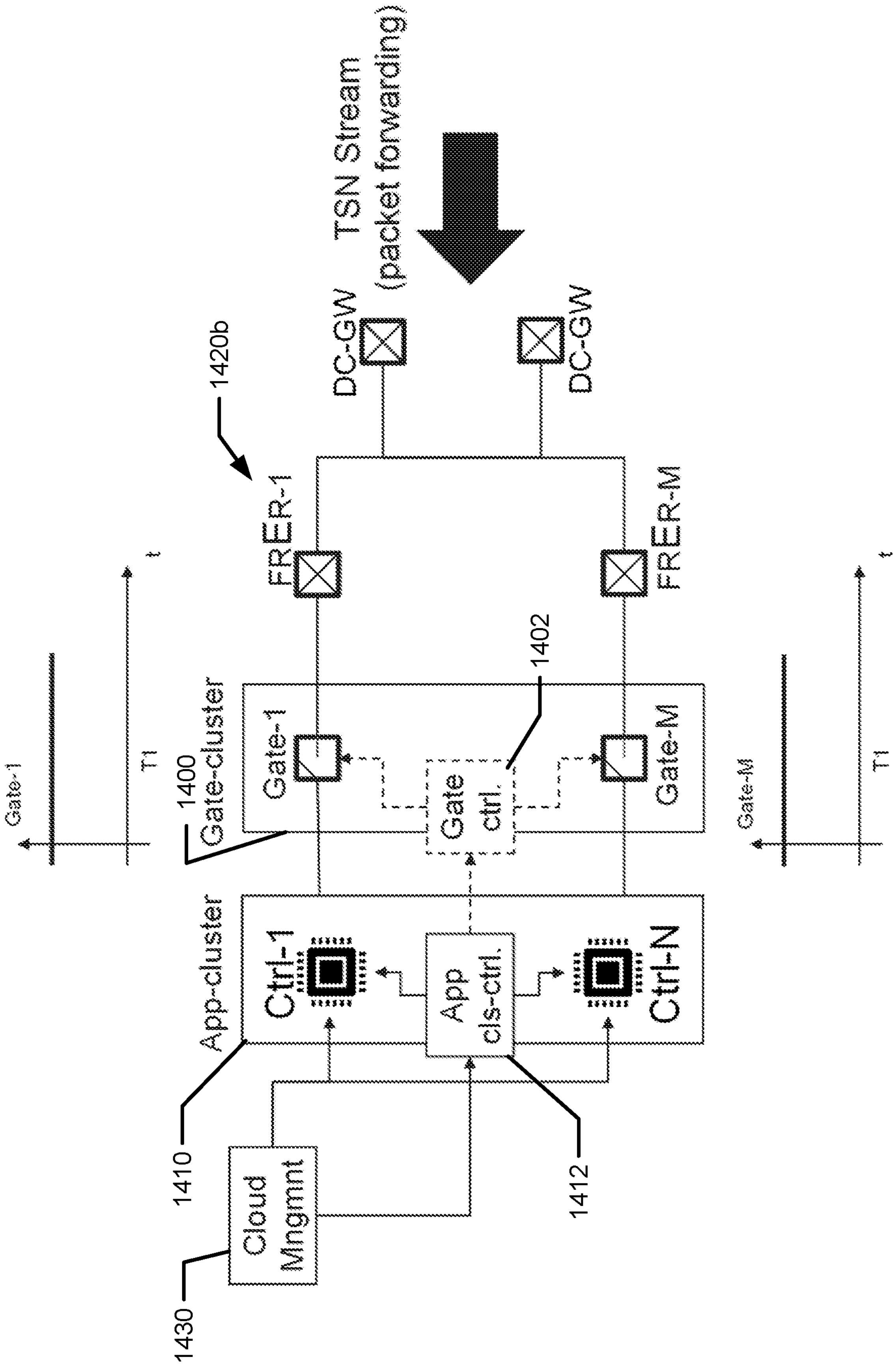
FIG. 16 illustrates the system of FIG. 14 which is adapted for forwarding TSN streams in the upstream direction in accordance with some embodiments of the present disclosure.

Forwarding of a TSN stream in an upstream direction from actors towards application instances is now described in the context of FIG. 16. FIG. 16 illustrates the system of FIG. 14 which is adapted for forwarding TSN streams in the upstream direction in accordance with some embodiments of the present disclosure.

Referring to FIG. 16, for the upstream traffic the Gate cluster 1400 operation depends on the characteristics of the application instances. There are two possibilities:

All Gates are always open; or

Only some of the Gates are open.

The first case where all Gates are always open, can be implemented by the Gate controller 1402 responsive to when the information from the ACC 1412 indicates that the packet or frame sent by the actor must reach all the application instances, i.e., where all application instances are upstream active needing to receive the packet or frame in the upstream direction from the actor via the network. For example, when sensor data is a needed input for each of the application instances of the application cluster 1410 in order to calculate the control for the actor(s), i.e., all of the application instances are "upstream active", the gate-controller 1402 controls all the Gates (e.g., Gate-1 to Gate-M) to be open and forward the TSN Stream to each of the application instances (e.g., Ctrl-1 to Ctrl-N) associated with the Gates.

The second case where only some of the Gates are open, can be implemented by the Gate controller 1402 when the information from the ACC 1412 indicates that some of the application instances are "upstream inactive" (also referred to as "standby") during which those application instances do not require input. In this scenario the architecture works as described below.

The Cloud Management 1430 creates the necessary (desired) application instances. Each application instance may operate as a listener for the upstream TSN Stream, i.e., to receive packets of the upstream TSN Stream. Redundancy of application instances is controlled by the ACC 1412. The ACC 1412 selects which of the application instances are upstream active and should receive packets from the packet or frame elimination entities 1420*b* (e.g., selected ones of the FRER-1 through FRER-M) of the FRER domain 1420 (FIG. 14). Input packets for the application instances are received via the Gate cluster 1400 from the packet or frame elimination entities 1420*b*. There is a Gate-x after each packet or frame elimination entity. For example, Gate-1 selectively forwards (when in "open state") or blocks (when in "closed state") packets from FRER-1 to one or more associated application instances, Gate-2 selectively forwards (when in "open state") or blocks (when in "closed state") packets from FRER-2 to one or more associated upstream active application instances, and so-on with Gate-M selectively forwarding (when in "open state") or blocking (when in "closed state") packets from FRER-M to one or more associated upstream active application instances, etc. A Gate-x may feed multiple application instances, e.g., feeding one or more application instances that have been programmatically defined to be associated with Gate-x. The ACC 1412 informs the Gate controller 1402 about a decision provided by ACC 1412 regarding which application instance(s) is(are) upstream active and need input from the FRER entities 1420*b* of the FRER domain 1420 (FIG. 14). The Gate controller 1402 selectively drives individual ones of the Gates according to the received information, e.g., opening all Gates or opening a selected one or more of the Gates while maintaining as closed or closing the non-selected one or more of the Gates. All the Gates serving upstream active application instances are controlled by the Gate controller 1402 to be in the open state for a given TSN Stream so that the upstream active application instances can receive packets of the TSN Stream. In contrast, the Gates corresponding to upstream inactive application instances are controlled by the Gate-controller 1402 to be in the closed state so that the upstream inactive application instances do not receive packets of the TSN Stream.

Figure 18:
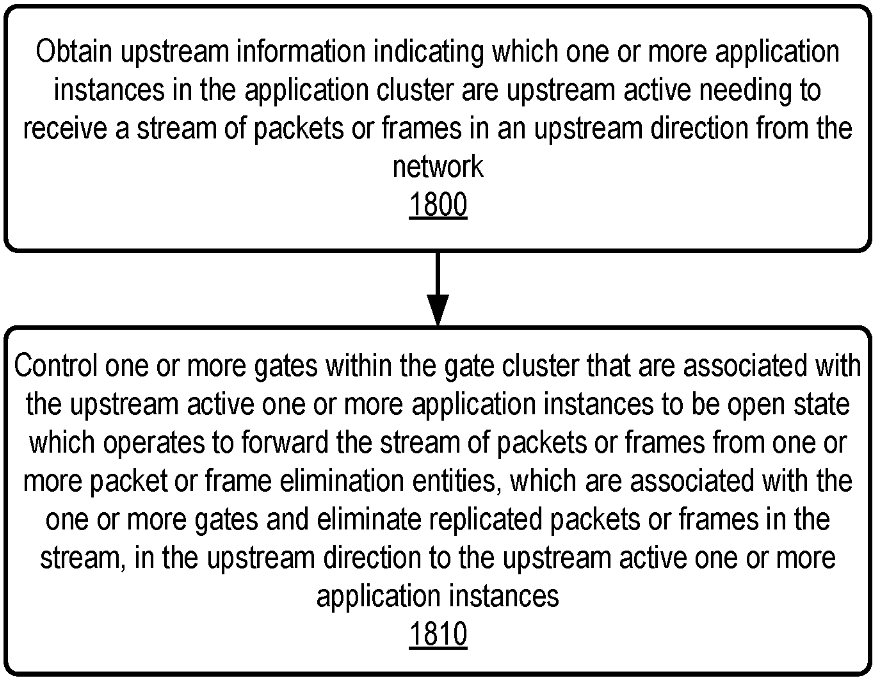

Corresponding operations by the gate controller 1402 are now described in the context of the flowchart of FIG. 18, in accordance with some embodiments. Referring to FIG. 18, the gate controller 1402 obtains 1800 upstream information (e.g., from the ACC 1412) indicating which one or more application instances in the application cluster 1410 are upstream active needing to receive a stream of packets or frames in an upstream direction from the network. Based on the upstream information, the gate controller 1402 controls 1810 one or more gates within the gate cluster 1400 that are associated with the upstream active one or more application instances to be open state which operates to forward the stream of packets or frames from one or more packet or frame elimination entities 1420*b*, which are associated with the one or more gates and eliminate replicated packets or frames in the stream, in the upstream direction to the upstream active one or more application instances.

The packet or frame elimination (FRER) entities 1420*b* act as the exit point of the FRER domain 1420 (FIG. 14). A packet or frame elimination (FRER) entity 1420*b* removes the sequence number information from the packet and sends it to the related one of the Gates. For example, FRER-1 removes the sequence number information from a packet and sends it to the related Gate-1 which, when in the open state, forwards the packet to an associated one or more upstream active application instances. Similarly, FRER-2 removes the sequence number information from a packet and sends it to the related Gate-2 which, when in the open state, forwards the packet to an associated one or more active application instances. In contrast, FRER-M removes the sequence number information from a packet and sends it to the related Gate-M which, when in the closed state, blocks (prevents) forwarding of the packet to an associated one or more inactive application instances.

With further reference to FIGS. 16 and 18, in some embodiments the gate controller 1402 operates to receive 1800 from the ACC 1412 that controls redundancy of the application instances that are concurrently executing, upstream information indicating which one or more application instances in the application cluster 1410 are upstream active needing to receive a stream of packets or frames in an upstream direction from the network. Based on the upstream information, the gate controller 1402 further operates to control 1810 one or more gates within the gate cluster 1400 that are associated with the upstream active one or more application instances to be open state which operates to forward the stream of packets or frames from one or more packet or frame elimination entities 1420*b*, which are associated with the one or more gates and eliminate replicated packets or frames in the stream, in the upstream direction to the upstream active one or more application instances.

In another embodiment, the gate controller 1402 operates to obtain 1800 upstream information indicating which one or more application instances in the application cluster 1410 are upstream active needing to receive a stream of packets or frames in an upstream direction from the network. Based on the upstream information, the gate controller 1402 controls 1810 one or more gates within the gate cluster (1400) that are associated with the upstream active one or more application instances to be open state. The one or more packet or frame elimination entities 1420*b* operate to remove sequence number information from a packet or frame received in the stream by the one or more packet or frame elimination entities 1420*b* to generate a modified packet or frame. The one or more packet or frame elimination entities 1420*b* further operate to forward the modified packet or frame to the one or more gates within the gate cluster 1400 that are associated with the upstream active one or more application instances. While the one or more gates associated with the upstream active one or more application instances are open state, the open state gates operate to forward the modified packet or frame in the upstream direction to the upstream active one or more application instances. In contrast, while the one or more gates associated with the upstream active one or more application instances are closed state, the closed state gates operate to block the modified packet or frame from being forwarded to the upstream active one or more application instances.

A listing of example embodiments of the present disclosure follows:

Embodiment 1. A method for packet or frame replication and elimination in a network, the method comprising:

obtaining (1700) by a gate controller (1402) downstream information indicating which application instance in an application cluster (1410) is downstream active needing to send a stream of packets or frames in a downstream direction through the network; and based on the downstream information, controlling (1710) by the gate controller (1402) a gate within a gate cluster (1400) that is associated with the downstream active application instance to be open state which operates to forward the stream of packets or frames in the downstream direction from the downstream active application instance to an associated packet or frame replication entity (1420*a*) for replication and transmission via at least two disjoint paths through the network.

Embodiment 2. The method of Embodiment 1, further comprising:

obtaining (1800) by the gate controller (1402) upstream information indicating which one or more application instances in the application cluster (1410) are upstream active needing to receive a stream of packets or frames in an upstream direction from the network; and based on the upstream information, controlling (1810) by the gate controller (1402) one or more gates within the gate cluster (1400) that are associated with the upstream active one or more application instances to be open state which operates to forward the stream of packets or frames from one or more packet or frame elimination entities (1420*b*), which are associated with the one or more gates and eliminate replicated packets or frames in the stream, in the upstream direction to the upstream active one or more application instances.

Embodiment 3. The method of any of Embodiments 1 to 2, wherein the controlling (1710) to change any of the gates between different ones of the open and closed states based on the downstream information is performed in a time synchronized manner.

Embodiment 4. The method of any of Embodiments 1 to 3, wherein the controlling (1710) by the gate controller (1402) of the gate within the gate cluster (1400) that is associated with the downstream active application instance to be open state, operates to allow only a single one of the gates in the gate cluster (1400) to be in the open state at a time which operates to forward the stream of packets or frames in the downstream direction to the associated packet or frame replication entity (1420*a*) for replication and transmission via the at least two disjoint paths through the network.

Embodiment 5. The method of any of Embodiments 1 to 4 wherein the packet or frame replication entity (1420*a*) replicates the packets or frames in the stream for transmission via the at least two disjoint paths through a Time-Sensitive Networking, TSN, network.

Embodiment 6. The method of any of Embodiments 1 to 5 further comprising triggering by the gate controller (1402) the packet or frame replication entity (1420*a*) to reset a sequence number generation function (320) based on the downstream information.

Embodiment 7. The method of Embodiment 6 further comprising:

identifying which one of the gates within the gate cluster (1400) is associated with the downstream active application instance and needs to be controlled (1710) by the gate controller (1402) to be open state; and triggering the packet or frame replication entity (1420*a*), which is associated with the identified gate, to reset the sequence number generation function (320).

Embodiment 8. The method of Embodiment 7 wherein:

the triggering of the packet or frame replication entity (1420*a*), which is associated with the identified gate, to reset the sequence number generation function (320) is performed before the identified gate is controlled to change from a closed state to the open state.

Embodiment 9. The method of any of Embodiments 6 to 8 wherein:

the triggering by the gate controller (1402) the packet or frame replication entity (1420*a*) to reset the sequence number generation function (320), is performed using a frerSeqRcvyReset managed object.

Embodiment 10. The method of any of Embodiments 6 to 9 wherein the triggering by the gate controller (1402)

the packet or frame replication entity (1420*a*) to reset the sequence number generation function (320), comprises:

triggering the packet or frame replication entity (1420*a*) to reset the sequence number generation function (320) responsive to no packets or frames being received by the packet or frame replication entity (1420*a*) in a threshold time interval.

Embodiment 11. The method of any of Embodiments 1 to 10 wherein:

the gate controller (1402) and the gate cluster (1400) are part of a packet or frame replication entities domain (1420).

Embodiment 12. The method of any of Embodiments 1 to 11 further comprising:

replicating by the packet or frame replication entity (1420*a*) the packets or frames in the stream received from the gate associated with the downstream active application instance to create Time-Sensitive Networking, TSN, streams for transmission via the at least two disjoint paths through the network.

Embodiment 13. The method of any of Embodiments 1 to 12 further comprising:

receiving (1800) by the gate controller (1402) from an application-cluster controller, ACC, (1412) that controls redundancy of the application instances that are concurrently executing, upstream information indicating which one or more application instances in the application cluster (1410) are upstream active needing to receive a stream of packets or frames in an upstream direction from the network; and based on the upstream information, controlling (1810) by the gate controller (1402) one or more gates within the gate cluster (1400) that are associated with the upstream active one or more application instances to be open state which operates to forward the stream of packets or frames from one or more packet or frame elimination entities (1420*b*), which are associated with the one or more gates and eliminate replicated packets or frames in the stream, in the upstream direction to the upstream active one or more application instances.

Embodiment 14. The method of any of Embodiments 1 to 13 further comprising:

obtaining (1800) by the gate controller (1402) upstream information indicating which one or more application instances in the application cluster (1410) are upstream active needing to receive a stream of packets or frames in an upstream direction from the network;

based on the upstream information, controlling (1810) by the gate controller (1402) one or more gates within the gate cluster (1400) that are associated with the upstream active one or more application instances to be open state;

removing sequence number information from a packet or frame received in the stream by the one or more packet or frame elimination entities (1420*b*) to generate a modified packet or frame;

forwarding the modified packet or frame to the one or more gates within the gate cluster (1400) that are associated with the upstream active one or more application instances;

while the one or more gates associated with the upstream active one or more application instances are open state, forwarding the modified packet or frame in the upstream direction to the upstream active one or more application instances; and while the one or more gates associated with the upstream active one or more application instances are closed state, blocking the modified packet or frame from being forwarded to the upstream active one or more application instances.

Embodiment 15. A network for packet or frame replication and elimination, the network comprising:

a gate controller (1402) adapted to:

obtain downstream information indicating which application instance in an application cluster (1410) is downstream active needing to send a stream of packets or frames in a downstream direction through the network; and based on the downstream information, control a gate within a gate cluster (1400) that is associated with the downstream active application instance to be open state which operates to forward the stream of packets or frames in the downstream direction from the downstream active application instance to an associated packet or frame replication entity (1420*a*) for replication and transmission via at least two disjoint paths through the network.

Embodiment 16. The network of Embodiment 15, wherein the gate controller (1402) is further adapted to:

obtaining upstream information indicating which one or more application instances in the application cluster (1410) are upstream active needing to receive a stream of packets or frames in an upstream direction from the network; and based on the upstream information, control one or more gates within the gate cluster (1400) that are associated with the upstream active one or more application instances to be open state which operates to forward the stream of packets or frames from one or more packet or frame elimination entities (1420*b*), which are associated with the one or more gates and eliminate replicated packets or frames in the stream, in the upstream direction to the upstream active one or more application instances.

Embodiment 17. The network of any of Embodiments 15 to 16, wherein the gate controller (1402) is further adapted to change any of the gates between different ones of the open and closed states based on the downstream information in a time synchronized manner.

Embodiment 18. The network of any of Embodiments 15 to 17, wherein the gate controller (1402) is further adapted to allow only a single one of the gates in the gate cluster (1400) to be in the open state at a time for operating to forward a stream of packets or frames in the downstream direction to the associated packet or frame replication entity (1420*a*) for replication and transmission via at least two disjoint paths through the network.

Embodiment 19. The network of any of Embodiments 15 to 18 wherein the packet or frame replication entity (1420*a*) is adapted to replicate the packets or frames in the stream for transmission via the at least two disjoint paths through a Time-Sensitive Networking, TSN, network.

Embodiment 20. The network of any of Embodiments 15 to 19 wherein the gate controller (1402) is further adapted to trigger the packet or frame replication entity (1420*a*) to reset a sequence number generation function (320) based on the downstream information.

Embodiment 21. The network of Embodiment 20 wherein the gate controller (1402) is further adapted to:

identify which one of the gates within the gate cluster (1400) is associated with the downstream active application instance and needs to be controlled (1710) by the gate controller (1402) to be open state; and trigger the packet or frame replication entity (1420*a*), which is associated with the identified gate, to reset the sequence number generation function (320).

Embodiment 22. The network of Embodiment 21 wherein the gate controller (1402) is further adapted to:

perform the triggering of the packet or frame replication entity (1420*a*), which is associated with the identified gate, to reset the sequence number generation function (320) before the identified gate is controlled to change from a closed state to the open state.

Embodiment 23. The network of any of Embodiments 19 to 22 wherein the gate controller (1402) is further adapted to:

trigger the packet or frame replication entity (1420*a*) to reset the sequence number generation function (320) using a frerSeqRcvyReset managed object.

Embodiment 24. The network of any of Embodiments 19 to 23 wherein the gate controller (1402) is further adapted to trigger the packet or frame replication entity (1420*a*) to reset the sequence number generation function (320), based on:

triggering the packet or frame replication entity (1420*a*) to reset the sequence number generation function (320) responsive to no packets or frames being received by the packet or frame replication entity (1420*a*) in a threshold time interval.

Embodiment 25. The network of any of Embodiments 15 to 24 wherein:

the gate controller (1402) and the gate cluster (1400) are part of a packet or frame replication entities domain (1420).

Embodiment 26. The network of any of Embodiments 15 to 25 wherein the packet or frame replication entity (1420*a*) is adapted to:

replicate the packets or frames in the stream received from the gate associated with the downstream active application instance to create Time-Sensitive Networking, TSN, streams for transmission via the at least two disjoint paths through the network.

Embodiment 27. The network of any of Embodiments 15 to 26 wherein the gate controller (1402) is further adapted to:

receive from an application-cluster controller, ACC, (1412) that controls redundancy of the application instances that are concurrently executing, upstream information indicating which one or more application instances in the application cluster (1410) are upstream active needing to receive a stream of packets or frames in an upstream direction from the network; and based on the upstream information, control one or more gates within the gate cluster (1400) that are associated with the upstream active one or more application instances to be open state which operates to forward the stream of packets or frames from one or more packet or frame elimination entities (1420*b*), which are associated with the one or more gates and eliminate replicated packets or frames in the stream, in the upstream direction to the upstream active one or more application instances.

Embodiment 28. The network of any of Embodiments 15 to 27 wherein:

the gate controller (1402) is further adapted to, obtain upstream information indicating which one or more application instances in the application cluster (1410) are upstream active needing to receive a stream of packets or frames in an upstream direction from the network, and based on the upstream information, control one or more gates within the gate cluster (1400) that are associated with the upstream active one or more application instances to be open state;

operate one or more packet or frame elimination entities (1420*b*), which are associated with the one or more gates, to:

remove sequence number information from a packet or frame received in the stream to generate a modified packet or frame, and forward the modified packet or frame to the one or more gates within the gate cluster (1400) that are associated with the upstream active one or more application instances; and the one or more gates associated with the upstream active one or more application instances are adapted to:

while in open state, forward the modified packet or frame in the upstream direction to the upstream active one or more application instances; and while in the closed state, block the modified packet or frame from being forwarded to the upstream active one or more application instances.

Embodiment 29. A computer program product comprising a non-transitory computer readable medium storing instructions executable by a network node to perform the method of any of Embodiments 1 to 14.

The invention claimed is:

1. A method for packet or frame replication and elimination in a network, the method comprising:

obtaining by a gate controller downstream information indicating which application instance in an application cluster is downstream active needing to send a stream of packets or frames in a downstream direction through the network;

based on the downstream information, controlling by the gate controller a gate within a gate cluster that is associated with the downstream active application instance to be in an open state which operates to forward the stream of packets or frames in the downstream direction from the downstream active application instance to an associated packet or frame replication entity for replication and transmission via at least two disjoint paths through the network; and triggering by the gate controller the packet or frame replication entity to reset a sequence number generation function based on the downstream information.

2. The method of claim 1, further comprising:

obtaining by the gate controller upstream information indicating which one or more application instances in the application cluster are upstream active needing to receive a stream of packets or frames in an upstream direction from the network; and based on the upstream information, controlling by the gate controller one or more gates within the gate cluster that are associated with the upstream active one or more application instances to be in an open state which operate to forward the stream of packets or frames from one or more packet or frame elimination entities, which are associated with the one or more gates and eliminate replicated packets or frames in the stream, in the upstream direction to the upstream active one or more application instances.

3. The method of claim 1, wherein the controlling to change any of the gates between different ones of the open and closed states based on the downstream information is performed in a time synchronized manner.

4. The method of claim 1, wherein the controlling by the gate controller of the gate within the gate cluster that is associated with the downstream active application instance to be in the open state, operates to allow only a single one of the gates in the gate cluster to be in the open state at a time which operates to forward the stream of packets or frames in the downstream direction to the associated packet or frame replication entity for replication and transmission via the at least two disjoint paths through the network.

5. The method of claim 1 wherein the packet or frame replication entity replicates the packets or frames in the stream for transmission via the at least two disjoint paths through a Time-Sensitive Networking (TSN) network.

6. The method of claim 1 further comprising:

identifying which one of the gates within the gate cluster is associated with the downstream active application instance and needs to be controlled by the gate controller to be in the open state; and triggering the packet or frame replication entity, which is associated with the identified gate, to reset the sequence number generation function.

7. The method of claim 6 wherein:

the triggering of the packet or frame replication entity, which is associated with the identified gate, to reset the sequence number generation function is performed before the identified gate is controlled to change from a closed state to the open state.

8. The method of claim 1 wherein:

the triggering by the gate controller the packet or frame replication entity to reset the sequence number generation function, is performed using a frerSeqRcvyReset managed object.

9. The method of claim 1 wherein the triggering by the gate controller the packet or frame replication entity to reset the sequence number generation function, comprises:

triggering the packet or frame replication entity to reset the sequence number generation function responsive to no packets or frames being received by the packet or frame replication entity in a threshold time interval.

10. The method of claim 1 wherein:

the gate controller and the gate cluster are part of a packet or frame replication entities domain.

11. The method of claim 1 further comprising:

replicating by the packet or frame replication entity the packets or frames in the stream received from the gate associated with the downstream active application instance to create Time-Sensitive Networking (TSN) streams for transmission via the at least two disjoint paths through the network.

12. The method of claim 1 further comprising:

receiving by the gate controller from an application-cluster controller (ACC) that controls redundancy of the application instances that are concurrently executing, upstream information indicating which one or more application instances in the application cluster are upstream active needing to receive a stream of packets or frames in an upstream direction from the network; and based on the upstream information, controlling by the gate controller one or more gates within the gate cluster that are associated with the upstream active one or more application instances to be in an open state which operates to forward the stream of packets or frames from one or more packet or frame elimination entities, which are associated with the one or more gates and eliminate replicated packets or frames in the stream, in the upstream direction to the upstream active one or more application instances.

13. The method of claim 1 further comprising:

obtaining by the gate controller upstream information indicating which one or more application instances in the application cluster are upstream active needing to receive a stream of packets or frames in an upstream direction from the network;

based on the upstream information, controlling by the gate controller one or more gates within the gate cluster that are associated with the upstream active one or more application instances to be in an open state;

removing sequence number information from a packet or frame received in the stream by one or more packet or frame elimination entities to generate a modified packet or frame;

forwarding the modified packet or frame to the one or more gates within the gate cluster that are associated with the upstream active one or more application instances;

while the one or more gates associated with the upstream active one or more application instances are in the open state, forwarding the modified packet or frame in the upstream direction to the upstream active one or more application instances; and while the one or more gates associated with the upstream active one or more application instances are in a closed state, blocking the modified packet or frame from being forwarded to the upstream active one or more application instances.

14. A gate controller in a network for packet or frame replication and elimination, the gate controller comprising:

at least one processor;

at least one memory connected to the at least one processor and storing program code that is executed by the at least one processor to perform operations comprising:

obtaining downstream information indicating which application instance in an application cluster is downstream active needing to send a stream of packets or frames in a downstream direction through the network;

based on the downstream information, controlling a gate within a gate cluster that is associated with the downstream active application instance to be in an open state which operates to forward the stream of packets or frames in the downstream direction from the downstream active application instance to an associated packet or frame replication entity for replication and transmission via at least two disjoint paths through the network; and triggering the packet or frame replication entity to reset a sequence number generation function based on the downstream information.

15. The gate controller of claim 14, wherein the gate controller is configured to perform further operations comprising:

obtaining upstream information indicating which one or more application instances in the application cluster are upstream active needing to receive a stream of packets or frames in an upstream direction from the network; and based on the upstream information, controlling one or more gates within the gate cluster that are associated with the upstream active one or more application instances to be in an open state which operate to forward the stream of packets or frames from one or more packet or frame elimination entities, which are associated with the one or more gates and eliminate replicated packets or frames in the stream, in the upstream direction to the upstream active one or more application instances.

16. The gate controller of claim 14, wherein the gate controller is further configured to change any of the gates between different ones of the open and closed states based on the downstream information in a time synchronized manner.

17. The gate controller of claim 14, wherein the gate controller is further configured to allow only a single one of the gates in the gate cluster to be in the open state at a time for operating to forward a stream of packets or frames in the downstream direction to the associated packet or frame replication entity for replication and transmission via at least two disjoint paths through the network.

18. The gate controller of claim 14 wherein the packet or frame replication entity is configured to replicate the packets or frames in the stream for transmission via the at least two disjoint paths through a Time-Sensitive Networking (TSN) network.

* * * * *